United States Patent
Lee et al.

(10) Patent No.: US 9,881,198 B2
(45) Date of Patent: Jan. 30, 2018

(54) ELECTRONIC DEVICE AND METHOD OF REGISTERING FINGERPRINT IN ELECTRONIC DEVICE

(71) Applicant: Samsung Electronics Co., Ltd., Gyeonggi-do (KR)

(72) Inventors: Seung-Yun Lee, Gyeonggi-do (KR); Young-Hoon Kwak, Gyeonggi-do (KR); Dong-Kyu Kim, Seoul (KR); Je-Yeong Jeong, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/043,439

(22) Filed: Feb. 12, 2016

(65) Prior Publication Data

US 2016/0239701 A1 Aug. 18, 2016

(30) Foreign Application Priority Data

Feb. 12, 2015 (KR) .................. 10-2015-0021898

(51) Int. Cl.
*G06K 9/00* (2006.01)
*G06F 21/32* (2013.01)

(52) U.S. Cl.
CPC ......... *G06K 9/00026* (2013.01); *G06F 21/32* (2013.01); *G06K 9/00067* (2013.01);
(Continued)

(58) Field of Classification Search
CPC ............. G06F 21/32; G06F 2221/2117; G06K 9/00026; G06K 9/00912; G06K 9/00013; G06K 9/00087; G06K 9/00067
(Continued)

(56) References Cited

U.S. PATENT DOCUMENTS

| 6,185,319 B1 * | 2/2001 | Fujiwara ............ G06K 9/00013 356/71 |
| 6,898,301 B2 * | 5/2005 | Iwanaga ............ G06K 9/00026 283/68 |

(Continued)

FOREIGN PATENT DOCUMENTS

| JP | 2003-337937 A | 11/2003 |
| KR | 10-0992573 B1 | 11/2010 |

(Continued)

OTHER PUBLICATIONS

Extended European Search Report dated Jul. 1, 2016 in connection with European Application No. 16154443.2, 8 pages.

(Continued)

*Primary Examiner* — Daniel Mariam

(57) ABSTRACT

An electronic device includes: a fingerprint input unit located in one area of the electronic device to receive a fingerprint of a user; and a controller configured to control a display unit to display information on a fingerprint registration progress situation in correspondence to a plurality of fingerprints that are sequentially input to the fingerprint input unit, determine whether a fingerprint of the user is to be registered according to the fingerprint registration progress situation information, and register a fingerprint of the user by using at least some of the plurality of fingerprints. A fingerprint registration progress situation can be identified when a fingerprint is registered.

18 Claims, 19 Drawing Sheets

(52) U.S. Cl.
CPC ..... *G06K 9/00087* (2013.01); *G06K 9/00912* (2013.01); *G06F 2221/2117* (2013.01)

(58) Field of Classification Search
USPC ................. 382/115, 124; 340/5.82, 5.83
See application file for complete search history.

(56) References Cited

U.S. PATENT DOCUMENTS

| | | | | |
|---|---|---|---|---|
| 7,020,309 | B2 * | 3/2006 | Bornes | G06K 9/00067 340/5.53 |
| 7,333,641 | B2 * | 2/2008 | Hara | G06K 9/00087 382/124 |
| 8,913,801 | B2 * | 12/2014 | Han | G06K 9/00013 382/100 |
| 9,501,618 | B1 * | 11/2016 | Wurst | G06F 19/322 |
| 2013/0023241 | A1 | 1/2013 | Lim | |
| 2014/0003678 | A1 | 1/2014 | Vieta et al. | |
| 2014/0003679 | A1 | 1/2014 | Han et al. | |

FOREIGN PATENT DOCUMENTS

| | | |
|---|---|---|
| KR | 10-1261189 B1 | 5/2013 |
| KR | 2013-0082979 A | 7/2013 |
| KR | 10-1317247 B1 | 10/2013 |

OTHER PUBLICATIONS

Chris Riley, et al., "Instruction, Feedback and Biometrics: The User Interface for Fingerprint Authentication Systems", Aug. 24, 2009, Springer International Publishing, XP019126310, 13 pages.

* cited by examiner ers patent document, those of ordinary skill in the art should

ELECTRONIC DEVICE AND METHOD OF REGISTERING FINGERPRINT IN ELECTRONIC DEVICE

CROSS-REFERENCE TO RELATED APPLICATION AND CLAIM OF PRIORITY

The present application is related to and claims benefit under 35 U.S.C. §119(a) to Korean Application Serial No. 10-2015-0021898, which was filed in the Korean Intellectual Property Office on Feb. 12, 2015, the entire content of which is hereby incorporated by reference.

TECHNICAL FIELD

Various embodiments of the present disclosure relate to an electronic device and a method of registering a fingerprint in the electronic device.

BACKGROUND

Recently, electronic devices have been developed, including various functions, for example, capturing of a picture or video, Internet communication, and the like, in addition to a simple call function. As the electronic devices encompass various functions, security of personal information is becoming more important. In particular, the personal information security is very important for an electronic device that includes functions that may cause significantly serious damage when they are illegally used by a stranger such as Internet financial services and the like. In this way, as importance of security of electronic devices increases, security functions of various methods are equipped to restrict use of the electronic devices by other users.

For the security, biological features are used to identify persons, and studies on the security technologies using various pieces of body information such as a fingerprint, a voice, a retina, a face, and an iris are being made. Among the various pieces of body information, the patterns of fingerprints of individuals are different, and in particular, because the danger of imitating fingerprints is low and the fingerprints rarely change during the lifetime, a security technology is getting the spotlight.

SUMMARY

The electronic device displays an execution screen that is irrelevant to a fingerprint of the user that is registered when the fingerprint of the user is registered, consumes much time in registering a fingerprint because fingerprints may not be recognized frequently if a location of a finger is wrongly input when the fingerprint is registered, and cannot identify whether the fingerprint is properly registered or how clearly the actual fingerprint of the user is registered.

Furthermore, when the electronic device fails to recognize a fingerprint, guide information for registration of a fingerprint, other than guide information that informs that the fingerprint cannot be recognized, is not provided.

To address the above-discussed deficiencies, it is a primary object to provide, for example, an electronic device that can display information on a fingerprint registration progress situation in correspondence to a plurality of sequentially input fingerprints, can determine whether a fingerprint of the user is to be registered according to the information on the fingerprint registration progress situation, and can register the fingerprint of the user by using at least some of the plurality of fingerprints, and a method of registering a fingerprint in an electronic device.

In accordance with an aspect of the present disclosure, there is provided an electronic device including: a fingerprint input unit that sequentially receives a fingerprint of a user sensed by at least one sensor; a display unit; and a controller configured to control the display unit to display information of an initially received fingerprint, change a display attribute of at least one fingerprint of the user that is sequentially received after the initially received fingerprint of the user, control the display unit to display information of the at least one fingerprint of the user according to the changed display attribute, and register a final fingerprint generated using at least one of the plurality of sequentially received fingerprint.

In accordance with another aspect of the present disclosure, there is provided a method of registering a fingerprint in an electronic device, the method including: sequentially receiving fingerprints of a user; displaying information of an initially received fingerprint of a user; changing a display attribute of at least one fingerprint of the user that is sequentially received after the initially received fingerprint of the user; displaying the at least one fingerprint of the user according to the changed display attribute; and registering a final fingerprint generated using at least one of the plurality of sequentially received fingerprints.

The electronic device and the method of registering a fingerprint in an electronic device according to various embodiments of the present disclosure can identify a fingerprint registration progress situation by displaying information on the fingerprint registration progress situation in correspondence to a plurality of sequentially input fingerprints, and can register a fingerprint of the user by using at least some of the plurality of fingerprints by determining whether a fingerprint of the user is to be registered according to the fingerprint registration progress situation information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the present disclosure will be more apparent from the following detailed description taken in conjunction with the accompanying drawings, in which: For a more complete understanding of the present disclosure and its advantages, reference is now made to the following description taken in conjunction with the accompanying drawings, in which like reference numerals represent like parts.

DETAILED DESCRIPTION

Figure 1:
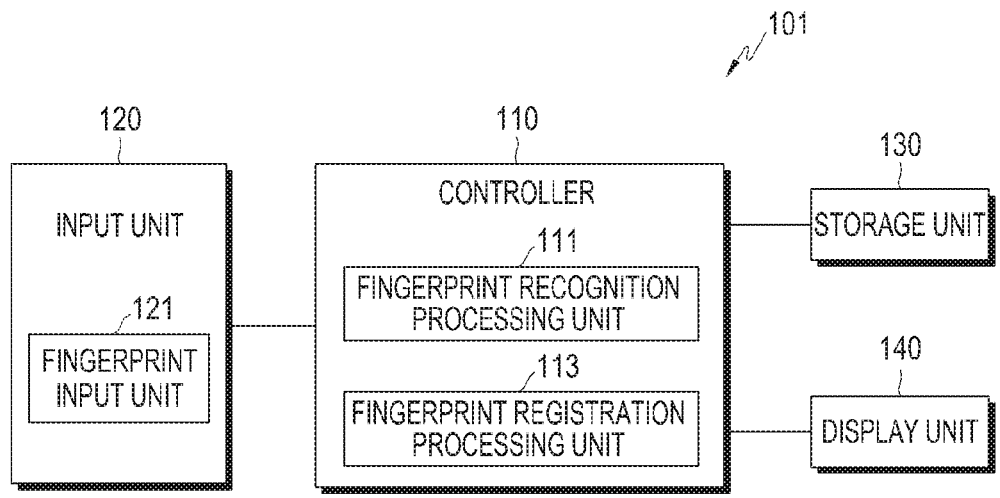
FIG. 1 illustrates a configuration example of an electronic device according to various embodiments of the present disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Hereinafter, the present disclosure will be described with reference to the accompanying drawings. The present disclosure may have various embodiments, and modifications and changes may be made therein. Therefore, the present disclosure will be described in conjunction with particular embodiments shown in the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "include" or "may include" refers to existence of a corresponding function, operation, or element, and does not limit one or more additional functions, operations, or elements. In the present disclosure, the terms such as "include" and/or "have" may be construed to denote a certain characteristic, number, step, operation, constituent element, element or a combination thereof, but may not be construed to exclude the existence of or a possibility of addition of one or more other characteristics, numbers, steps, operations, constituent elements, elements or combinations thereof.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may be any device including at least one processor, and may include a camera, a portable device, a mobile terminal, a communication terminal, a portable communication terminal, a portable mobile terminal, and the like. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., SAMSUNG HOMESYNC™, APPLE TV™, or GOOGLE TV™), a game console (e.g., XBOX™ and PLAYSTATION™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings.

Hereinafter, in various embodiments of the present disclosure, it will be described that a fingerprint is used to perform an operation of driving an electronic device or locking or unlocking at least one function of an application while the electronic device is locked. In various embodiments of the present disclosure, a fingerprint of the user may be registered in advance before the electronic device performs a locking or unlocking operation using a fingerprint, and a device and an operational procedure for registering a fingerprint in the electronic device will be described in detail with reference to the accompanying drawings.

FIG. 1 is a block diagram illustrating a configuration example of an electronic device according to an embodiment of the present disclosure.

Referring to FIG. 1, according to various embodiments of the present disclosure, the electronic device 101 may include at least one of a controller 110, an input unit 120, a storage unit 130, and a display unit 140. According to some embodiments, the electronic device may omit at least one of the components or may additionally include other components.

According to various embodiments of the present disclosure, the controller 110 of the electronic device may 101 process information according to an operation of the electronic device and information (for example, contents) according to execution of an application or a function, and may perform a control to display information according to execution of an application on an execution screen.

According to various embodiments of the present disclosure, the controller 100 may control an operation related to recognition of a fingerprint and registration of a fingerprint, and may include a fingerprint recognition processing unit 111 for processing an operation related to recognition of a fingerprint and a fingerprint registration processing unit 113 for processing an operation related to registration of a fingerprint.

According to various embodiments of the present disclosure, the controller 110 may perform a control to receive a fingerprint of the user using at least one sensor (not illustrated) provided in the electronic device 101 and to recognize a fingerprint input through the fingerprint recognition processing unit 111. At least one sensor provided in the electronic device 101 may include at least one of a fingerprint recognition sensor and a camera sensor, and may include various sensors capable of recognizing a fingerprint without limitation.

According to various embodiments of the present disclosure, the controller 110 may sequentially receive fingerprints of the user, generate information on a fingerprint registration progress situation in response to a plurality of input fingerprints, and display information on the generated fingerprint registration progress situation. According to various embodiments of the present disclosure, information on the fingerprint registration progress situation may be displayed on an execution screen of the fingerprint recognition and fingerprint registration function or application. The information on the fingerprint registration progress situation may include at least one of display form information of the plurality of sequentially input fingerprints when the fingerprint registration is progressed (for example, at least one of a user fingerprint image, a gauge bar and a message), display attribute information (for example, at least one of shape, color, brightness, light and shade, contrast, chroma, size, width, height, area, density, margin, and transparency), and fingerprint registration process rate information. The information on the fingerprint registration progress situation may be displayed according to display form information, for example, a fingerprint image corresponding to the plurality of input fingerprints, that is, a fingerprint image of the actual user.

According to various embodiments of the present disclosure, the controller 110 may set information on the fingerprint registration progress situation to display fingerprint images of the user sequentially and more clearly (for example, gradually densely, gradually brightly, gradually clearly, or realistically) whenever the fingerprint images of the user are displayed, by using display form information or display attribute information. According to various embodiments of the present disclosure, the controller 110 may perform a control to sequentially distinguish ridges and valleys more clearly through contrast of the ridges and the valleys in sequentially input fingerprint areas when the ridges and the valleys are displayed.

According to various embodiments of the present disclosure, the controller 110 may set information on the fingerprint registration progress situation such that the registration progress rate of the input fingerprint is displayed, for example, in the form of a gauge bar, sequentially whenever the user inputs a fingerprint.

According to various embodiments of the present disclosure, the controller 110 may set information on the fingerprint registration progress situation by using at least one of the display form information and the display attribute information such that display attributes of an overlapping fingerprint area of a fingerprint image corresponding to the input fingerprint and a non-overlapping fingerprint area are different from each other when displayed, sequentially whenever the user inputs a fingerprint by using the display form information and the display attribute information. According to various embodiments of the present disclosure, the controller 110 may perform a control to display the fingerprint areas of the sequentially displayed fingerprint images that are recognized as overlapping each other gradually densely according to the overlapping degree and may display an area that is recognized as not overlapping, that is, a newly recognized fingerprint area blurredly. According to various embodiments of the present disclosure, the controller 110 may differently set display attributes of the overlapping fingerprint area according to the repetition degree of the overlapping fingerprint area. For example, the controller 110 may perform a control to differently display colors (for example, a fingerprint area that is recognized once is displayed by a black color, a fingerprint area that is recognized twice is displayed by an orange color, and a fingerprint area that is recognized three times is displayed by a red color) according to the degree by which the fingerprint area recognized as overlapping overlaps. In addition, the controller 110 may perform a control to differently display a fingerprint area recognized as overlapping and a newly recognized fingerprint area according to various display schemes.

According to various embodiments of the present disclosure, the controller 110 may display a guide message that guides a registration progress situation through a text or a voice sequentially whenever the user inputs a fingerprint. According to various embodiments of the present disclosure, the controller 110 may perform a control to display a guide message that guides a fingerprint registration progress rate together with a fingerprint image or a gauge bar generated in correspondence to the input fingerprint, or separately.

At least some functions of the controller 110 illustrated in FIG. 1 may be performed in a processor (for example, an application processor).

A more detailed operation of displaying information on the fingerprint registration progress situation according to various embodiments of the present disclosure will be described with reference to the accompanying drawings.

According to various embodiments of the present disclosure, the controller 110 may guide a directionality for the following fingerprint input by using feature points extracted from a plurality of sequentially input fingerprints. According to various embodiments of the present disclosure, the controller 110 may extract at least one feature point from the recognized fingerprint, and may guide a fingerprint input direction such that a fingerprint area at another location of the user is input with reference to the feature point. The controller 110 may recognize the input fingerprint according to the guided fingerprint input direction if the user inputs a fingerprint again, and may identify the location of the recognized fingerprint and guide the following fingerprint input direction again according to the identified location. The controller 110 may stop the guidance of the fingerprint input direction when a set condition, for example, a fingerprint of the user is sufficiently secured or all locations of referenced feature points are identified in a determined direction. When the set condition is satisfied, the controller 110 may perform a control to stop the inputting of a fingerprint by the user, and to register a fingerprint of the user by using at least some of the plurality of input fingerprints.

According to various embodiments of the present disclosure, the controller 110 may perform a control to register a fingerprint of the user by using some of the plurality of fingerprints processed in the fingerprint recognition processing unit 11. According to various embodiments of the present disclosure, the controller 110 may synthesize at least some of the plurality of processed fingerprints, and may register the synthesized fingerprint as a fingerprint of the user. According to various embodiments of the present disclosure, the controller 110 may select at least one of the plurality of processed fingerprints, which is clearly recognized, for example, which has a high recognition rate, and may register the selected fingerprint as a fingerprint of the user. According to various embodiments of the present disclosure, when the controller 110 processes the sequentially input fingerprints such that they become gradually clearer (for example, some or all of the fingerprint images corresponding to the sequentially processed fingerprints are displayed gradually densely, brightly, clearly, or realistically), it may register the finally processed fingerprint as a fingerprint of the user.

According to various embodiments of the present disclosure, the controller 110 may register a fingerprint image within a predetermined radius from the most overlapping fingerprint area of the synthesized fingerprint image as a fingerprint of the user. If a progress situation for registration of a fingerprint corresponds to a set condition, the controller 110 may perform a control to stop inputting a fingerprint of the user half-way without inputting a fingerprint by a predetermined number of times and register a fingerprint of the user by using at least some of the plurality of fingerprints input before. Here, the set condition may include at least one of conditions on whether a fingerprint area of all determined directions reaches an input, or a fingerprint area corresponding to a determined area reaches an input or a value (for example, 100%) to which a fingerprint registration progress rate is set. According to various embodiments of the present disclosure, the controller 110 of the electronic device 101 may perform a control to display an initially recognized one of the plurality of sequentially input fingerprints, may perform a control to change a display attribute of at least one fingerprint that is recognized after the initially recognized fingerprint of the plurality of fingerprints, may perform a control to display the at least one fingerprint based on the changed display attribute.

According to various embodiments of the present disclosure, the controller 110 of the electronic device 101 may further include an operation execution unit (not illustrated) that executes an operation of the electronic device. The operation execution unit may perform a control to execute an operation in correspondence to an input of the user or a detected input. According to various embodiments of the present disclosure, the operation execution unit may control the display unit 140 such that the display unit 140 displays an execution screen, an application, or information according to execution of an operation, and may control various operations (for example, at least one of generation of vibrations, output of sound source information through a speaker, and an operation related to a camera module) of the electronic device.

According to various embodiments of the present disclosure, the controller 110 of the electronic device 101 may be at least a part of a processor, and may include one or a combination of two of hardware, software, and firmware.

According to various embodiments of the present disclosure, the controller 110 of the electronic device 101 may include, as a part thereof in a hardware aspect, at least one processor including a central processing unit (CPU) and a micro processing unit (MPU), a memory (for example, a register and/or a random access memory (RAM)) in which at least one memory loading data is loaded, and a bus through which at least one data is input and output to and from the processor and the memory. The controller 110 may include a predetermined program routine or program data that are loaded from a predetermined recording medium to a memory and calculated by the processor to perform a function defined in the electronic device in a hardware scheme.

According to various embodiments of the present disclosure, the input unit 120 of the electronic device 101 may deliver various pieces of information including number and letter information input from the user and a signal input in relation to settings of various functions and a function control of the electronic device to the controller 110. The input unit 120 may support a user input for executing an application that supports a specific function. The input unit 120 may include a key input unit such as a keyboard or a keypad, a touch input unit such as a touch sensor or a touch pad, a sound source input unit, and at least one of various sensors and cameras, and may include a gesture input unit. In addition, the input unit 120 may include an input unit in all forms that is being developed or may be developed later. According to various embodiments of the present disclosure, the input unit 120 may receive information input by the user through a touch panel or a camera module (not illustrated) of the display unit 140, and may deliver the input information to the controller 110

According to various embodiments of the present disclosure, the input unit 120 may include a fingerprint input unit 121 that receives a fingerprint of the user detected through at least one sensor provided in the electronic device 101. The fingerprint input unit 121 of the input unit 120 may receive a fingerprint from the user and may deliver the input fingerprint to the controller 110. The at least one sensor may be at least one of a fingerprint recognition sensor and a camera sensor, but is not limited thereto and may include various sensors that may detect a fingerprint. The input unit 120 may sequentially receive a fingerprint of the user under the control of the controller 110.

According to various embodiments of the present disclosure, a storage unit 130 of the electronic unit 101 may temporarily store various data generated during execution of a program, including a program necessary for a functional operation according to various embodiments of the present disclosure. The storage unit 130 may largely include a program area and a data area. The program area may store information related to driving of the electronic device, such as an operating system (OS) that boots the electronic device. The data area may store transmitted and received data and generated data according to various embodiments of the present disclosure. The storage unit 130 may include at least one storage medium of a flash memory, a hard disk, a multimedia card micro type memory (for example, an SD or XD memory), a RAM, and a ROM.

According to various embodiments of the present disclosure, the storage unit 130 of the electronic device 101 may store information related to an application for recognition of a fingerprint or registration of a fingerprint, may store fingerprints input by the user when a fingerprint is registered, and may store result information according to processing of input fingerprints. The storage unit 130 may store at least one of information on a plurality of recognition-processed fingerprints, fingerprint images generated in correspondence to the plurality of processed fingerprints, information related to a fingerprint registration progress situation by which a fingerprint registration progress situation may be identified, information related to a guidance of a fingerprint registration direction, and a registered fingerprint.

According to various embodiments of the present disclosure, the display unit 140 of the electronic device 101 may display operation execution information and operation execution result information according to an operation control from the operation execution unit (not illustrated). The display unit 140 may display various pieces of information (at least one of a text image, a video, and a sound source) to the user or may output sound source information. The display unit 140 may display an input window on a screen or an input pad (for example, a button) through which at least one of various letters, numbers, and symbols may be input to an input window. The display unit 140 may display a service execution screen according to execution of various applications related to transmission and reception of information.

According to various embodiments of the present disclosure, the display unit 140 of the electronic device 101 may display an execution screen of an application that is executed for registration of a fingerprint, and may display information on a fingerprint image and/or a fingerprint registration progress situation corresponding to a user fingerprint input through the input unit 120 on an execution screen of the executed application.

According to various embodiments of the present disclosure, the display unit 140 may display a fingerprint image corresponding to an input fingerprint whenever the controller 110 receives a fingerprint of the user, and may sequentially display the displayed fingerprint images more clearly (for example, gradually densely, gradually brightly, gradually clearly, or gradually realistically). According to various embodiments of the present disclosure, the display unit 140 may display a fingerprint image or information on a registration progress situation according to at least one of the display form information and display attribute information under the control of the controller 110. The display unit 140 may display a gauge bar according to a registration progress rate of an input fingerprint, sequentially whenever the user inputs a fingerprint.

According to various embodiments of the present disclosure, the display unit 140 may differently display an overlapping fingerprint area and a non-overlapping fingerprint area of the processed fingerprint sequentially whenever the user inputs a fingerprint by making display attributes (for example, at least one of shape, color, brightness, light and shade, contrast, chroma, size, width, height, area, density, margin, and transparency) different under the control of the controller 110. According to various embodiments of the present disclosure, the display unit 140 may display the fingerprint areas of the sequentially displayed fingerprint images that are recognized as overlapping each other gradually densely according to the overlapping degree and may display an area that is recognized as not overlapping, that is, a newly recognized fingerprint area blurredly under the control of the controller 110. According to various embodiments of the present disclosure, the display unit 140 may differently display colors (for example, a fingerprint area that is recognized once is displayed by a black color, a fingerprint area that is recognized twice is displayed by an orange color, and a fingerprint area that is recognized three times is displayed by a red color) according to the degree by which the area recognized as overlapping overlaps under the control of the controller 110. In addition, the display unit 140 may differently display a fingerprint area recognized as overlapping and a newly recognized fingerprint area according to various display schemes under the control of the controller 110. According to various embodiments of the present disclosure, the display unit 140 may display or provide, as a sound source, a guide message that guides a registration progress situation through a text or a voice sequentially whenever the user inputs fingerprints under the control of the controller 110. According to various embodiments of the present disclosure, the controller 110 may display a guide message that guides a fingerprint registration progress rate together with a fingerprint image or a gauge bar generated in correspondence to the input fingerprint, or separately.

According to various embodiments of the present disclosure, when the display unit 140 of the electronic device 101 is implemented in the form of a touch screen, the input unit 120 and/or the display unit 140 may correspond to a touch screen. When the display unit 140 is implemented together with the input unit 120 in the form of a touch screen, various pieces of information generated according to a touch operation of the user may be displayed.

According to various embodiments of the present disclosure, the display unit 140 of the electronic device 101 may include at least one of a Liquid Crystal Display (LCD), a Thin Film Transistor LCD (TFT-LCD), an Organic Light Emitting Diode (OLED), a Light Emitting Diode (LED), an Active Matrix Organic LED (AMOLED), a flexible display, and a 3-dimensional display. Some of the displays may be implemented in a transparent type or a light transmission type such that the outside can be seen therethrough. This may be configured in the form of a transparent display including a Transparent OLED (TOLED).

Locations of the main components of the electronic device 101 illustrated in FIG. 1 may be changed according to various embodiments of the present disclosure.

In this way, the main components of the electronic device have been described through the electronic device 101 of FIG. 1. However, not all of the components illustrated through FIG. 1 are essential, and the electronic device may be implemented by a larger number of components than the illustrated components, or may be implemented by a smaller number of components. For example, the electronic device may further include a sound source output unit (for example, a speaker) (not illustrated) that converts a sound source that is an electrical signal to an analog signal to output the analog signal.

For example, when the electronic device communicates with another electronic device or an external device, it may further include a communication unit (not illustrated). According to various embodiments of the present disclosure, the communication unit may transmit and receive information related to registration of a fingerprint under the control of the controller 110. For example, the communication unit may receive an application that executes registration of a fingerprint from a server (not illustrated). According to various embodiments of the present disclosure, when the server performs at least some functions for processing recognition of a fingerprint or registration of a fingerprint of the controller 110, the communication unit may receive or transmit information related to a function of processing recognition of a fingerprint or registration of a fingerprint to or from the server through the at least some functions. According to various embodiments of the present disclosure, when the server or another electronic device manages the registered fingerprint of the user, the communication unit may transmit and receive information related thereto.

The communication unit may communicate through connection to a network or inter-device connection through wireless or wired communication via a communication interface. The wireless communication may include at least one of, for example, Wi-Fi, BLUETOOTH (BT), Near Field Communication (NFC), Global Positioning System (GPS) and cellular communication (for example, LTE, LTE-A, CDMA, WCDMA, UMTS, WiBro, GSM or the like). The wired communication may include at least one of, for example, a Universal Serial Bus (USB), a High Definition Multimedia Interface (HDMI), Recommended Standard 232 (RS-232), and a Plain Old Telephone Service (POTS). Further, the communication unit may include all forms of communication schemes that have been widely known or will be developed later in addition to the above-mentioned communication schemes.

An electronic device according to any one of various embodiments of the present disclosure includes: a fingerprint input unit that sequentially receives a fingerprint of a user sensed by at least one sensor, a display unit, when the fingerprint of the user is received, that displays the received fingerprint, and a controller configured to control the display unit to display an initially received fingerprint, change a display attribute of at least one fingerprint of the user that is sequentially received after the initially received fingerprint of the user, control the display unit to display the at least one fingerprint of the user according to the changed display attribute, and register a final fingerprint generated using at least one of the plurality of sequentially received fingerprints.

According to various embodiments of the present disclosure, the controller performs a control the display unit to display fingerprint images generated in correspondence to the plurality of sequentially input fingerprints sequentially densely according to a information relating to fingerprint registration progress situation.

According to various embodiments of the present disclosure, the controller performs a control to change the display attribute to display a fingerprint shape of a currently received fingerprint of the user more densely than a fingerprint shape of a previously received fingerprint of the user.

According to various embodiments of the present disclosure, the controller performs a control to change the display attribute to display a fingerprint shape of a currently received fingerprint more brightly or clearly than a fingerprint shape of a previously received fingerprint of the user.

According to various embodiments of the present disclosure, the controller performs a control to incorporate the generated images sequentially displayed and to register the incorporated fingerprint image as the final fingerprint of the user.

According to various embodiments of the present disclosure, the controller performs a control to display fingerprint registration progress rates based on information relating to the fingerprint registration progress situation whenever fingerprint of the user is received.

According to various embodiments of the present disclosure, if the fingerprint registration progress situation corresponds to a set condition, the controller performs a control to stop inputting the user fingerprint and to register the user fingerprint by using at least one of the plurality of previously received fingerprints.

According to various embodiments of the present disclosure, the controller performs a control to display a fingerprint image corresponding to the fingerprint together with fingerprint registration progress rates based on information on the fingerprint registration progress situation whenever fingerprints of the user are received.

According to various embodiments of the present disclosure, the controller performs a control to compare the plurality of sequentially received fingerprints to identify an overlapping fingerprint area and a non-overlapping fingerprint area of a currently received fingerprint, to differently set display attributes of the overlapping fingerprint area and the non-overlapping fingerprint area, and to display the currently received fingerprint according to the set display attributes.

According to various embodiments of the present disclosure, the controller differently sets the display attribute of the overlapping fingerprint area according to an overlapping degree of the overlapping fingerprint area.

According to various embodiments of the present disclosure, the controller synthesizes fingerprint images generated in correspondence to the plurality of sequentially received fingerprints, and registers the final fingerprint based on fingerprint image within a predetermined radius from the most overlapping fingerprint area on the synthesized fingerprint image.

According to various embodiments of the present disclosure, the information on the fingerprint registration progress situation includes at least one of display form information, display attribute information, and fingerprint registration progress rate information of the plurality of sequentially received fingerprints.

According to various embodiments of the present disclosure, the controller performs a control to conduct a guide for the next fingerprint received based on information relating to the fingerprint registration progress situation.

According to various embodiments of the present disclosure, the controller performs a control to identify a location of a reference feature point detected from the currently received fingerprint of the user and to guide a fingerprint input direction for the next fingerprint input according to the identified location.

According to various embodiments of the present disclosure, the controller performs a control to set a central area of the currently received fingerprint of the user as a reference area and to guide a fingerprint input direction for the next fingerprint input based on the reference area.

According to various embodiments of the present disclosure, the controller performs a control to set a fingerprint area, which will be registered, based on a distribution of a plurality of feature points detected from the plurality of sequentially received fingerprints and to register the fingerprint of the user containing the set fingerprint area.

Figure 2:
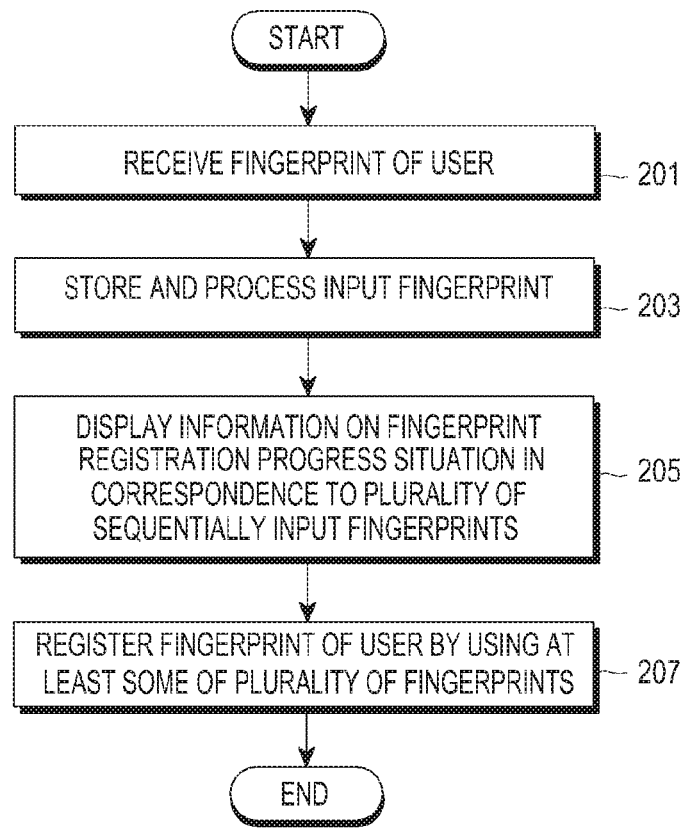
FIG. 2 illustrates an operation procedure of an electronic device according to various embodiments of the present disclosure.
Figure 3:
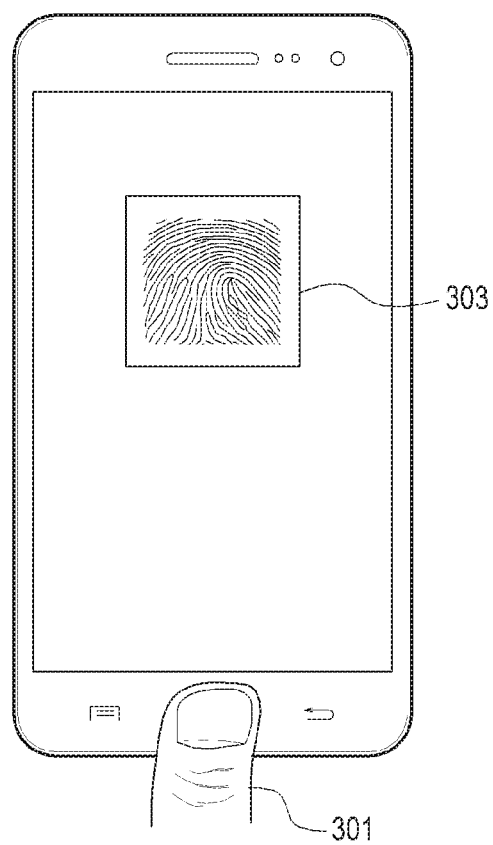
FIG. 3 illustrates a fingerprint registration screen of an electronic device according to various embodiments of the present disclosure.

FIG. 2 is a flowchart illustrating an operation procedure of an electronic device according to various embodiments of the present disclosure. FIG. 3 is a diagram illustrating a fingerprint registration screen of an electronic device according to various embodiments of the present disclosure.

Referring to FIGS. 2 and 3, according to an embodiment of the present disclosure, in operation 201, if the user inputs 301 a fingerprint in one area of an electronic device as illustrated in FIG. 3, the electronic device (for example, the electronic device 101 of FIG. 1) may receive a fingerprint of the user that is detected through at least one sensor located in the one area.

In operation 203, the electronic device may temporarily store the input fingerprint, and may process recognition of a fingerprint for the temporarily stored fingerprint. Operations 201 and 203 may be repeated according to a fingerprint registration progress situation. According to various embodiments, the electronic device may extract directional component data of a fingerprint shape by analyzing the input fingerprint, and may recognize the input fingerprint by binarizing and classifying the extracted directional component data. As illustrated in FIG. 3, the electronic device may generate a fingerprint image 303 corresponding to the recognized fingerprint. According to various embodiments of the present disclosure, the electronic device may display the generated fingerprint image 303. According to various embodiments of the present disclosure, the electronic device may synthesize at least one previously generated fingerprint image and the currently generated image such that the recognized fingerprint may be viewed more clearly whenever the user inputs a fingerprint.

In operation 205, the electronic device may generate information on a fingerprint registration progress situation in correspondence to a plurality of sequentially input fingerprints, and may display information on the fingerprint registration progress situation in various schemes to inform the user of the generated fingerprint registration progress situation. According to various embodiments of the present disclosure, the electronic device may identify a fingerprint registration progress situation of the sequentially input and recognized fingerprint, and may display information on the identified fingerprint registration progress situation on an execution screen for registration of a fingerprint. The information on the fingerprint registration progress situation may be displayed by using a fingerprint image corresponding to the plurality of input fingerprints, that is, a fingerprint image of the actual user, and may include at least one of display form information of the plurality of fingerprints sequentially input (for example, at least one of a user fingerprint image, a gauge bar and a message), display attribute information (for example, at least one of shape, color, brightness, light and shade, contrast, chroma, size, width, height, area, density, margin, and transparency), and fingerprint registration progress rate information.

According to various embodiments of the present disclosure, the electronic device may display the initially recognized fingerprint of the plurality of sequentially input fingerprints, and may change a display attribute of the fingerprint that is displayed according to the number of the plurality of fingerprints that are recognized after the initially recognized fingerprint. According to various embodiments of the present disclosure, the electronic device may set information on the fingerprint registration progress situation by using display form information or display attribute information such that the displayed fingerprint image may be displayed sequentially densely whenever the fingerprint image of the user is displayed. That is, the electronic device may change the display attribute of the currently recognized fingerprint and may display the fingerprint image corresponding to the currently recognized fingerprint more densely than the fingerprint image corresponding to the previously recognized fingerprint.

According to various embodiments of the present disclosure, the electronic device may set information on the fingerprint registration progress situation such that a gauge bar according to the fingerprint registration progress rate may be displayed by using at least one of the display form information and the display attribute information sequentially whenever the user inputs fingerprints. Furthermore, according to various embodiments of the present disclosure, the electronic device may set information on the fingerprint registration progress situation such that display attributes (for example, light and shade or color) of an overlapping fingerprint area of a fingerprint image corresponding to the input fingerprint and a non-overlapping fingerprint area are different from each other when displayed, sequentially whenever the user inputs fingerprints by using at least one of the display form information and the display attribute information.

According to various embodiments of the present disclosure, the electronic device may perform a control to display the repeatedly recognized fingerprint areas of the sequentially displayed fingerprint images gradually densely, gradually brightly, or gradually clearly according to the overlapping degree and to display an area that is not repeatedly recognized, that is, a newly recognized fingerprint area blurredly. According to various embodiments of the present disclosure, the controller 110 may differently display colors (for example, a fingerprint area that is recognized once is displayed by a black color, a fingerprint area that is recognized twice is displayed by an orange color, and a fingerprint area that is recognized three times is displayed by a red color) according to the degree by which the area recognized as overlapping overlaps. In addition, the controller 110 may differently display a repeatedly recognized fingerprint area and a newly recognized fingerprint area according to various display schemes.

According to various embodiments of the present disclosure, the electronic device may set information on the fingerprint registration progress situation such that a guide message that guides a registration progress situation may be displayed through a text or a voice, sequentially whenever the user inputs a fingerprint. According to various embodiments of the present disclosure, the electronic device may display a guide message that guides a fingerprint registration progress rate together with a fingerprint image or a gauge bar generated in correspondence to the input fingerprint, or separately.

In operation 207, the electronic device may register fingerprints of the user by using at least some of the plurality of fingerprints. According to various embodiments of the present disclosure, the electronic device may synthesize at least some of the plurality of processed fingerprints, and may register the synthetized fingerprint as a fingerprint of the user. According to various embodiments of the present disclosure, the electronic device may select at least one of the plurality of processed fingerprints, which is clearly recognized, for example, which has a high recognition rate, and may register the selected fingerprint as a fingerprint of the user. Furthermore, according to various embodiments of the present disclosure, when the electronic device processes the sequentially input fingerprints such that they become gradually clearer (for example, the fingerprint images corresponding to the sequentially processed fingerprints are displayed gradually densely, brightly, clearly, or realistically), it may register the finally processed fingerprint as a fingerprint of the user.

A method of registering a fingerprint in an electronic device according to any one of various embodiments of the present disclosure includes: displaying information of an initially received fingerprint of a user, changing a display attribute of at least one fingerprint of the user that is sequentially received after the initially received fingerprint of the user, displaying the at least one fingerprint of the user according to the changed display attribute and registering a final fingerprint generated using at least one of the plurality of sequentially received fingerprints.

According to various embodiments of the present disclosure, the displaying of information relating to a fingerprint registration progress situation includes displaying fingerprint images generated in correspondence to the plurality of sequentially received fingerprints sequentially densely according to the fingerprint registration progress situation information.

According to various embodiments of the present disclosure, the display attribute of at least one fingerprint of the user is changed to displaying a fingerprint shape of a currently received fingerprint of the user more densely than a fingerprint shape of a previously received fingerprint of the user.

According to various embodiments of the present disclosure, the display attribute of at least one fingerprint of the user is changed to display a fingerprint shape of a currently received fingerprint more brightly or clearly than a fingerprint shape of a previously received fingerprint.

According to various embodiments of the present disclosure, the displaying of the information on the fingerprint registration progress situation includes: identifying fingerprint registration progress rates based on information relating to the fingerprint registration progress situation whenever fingerprints of the user are input; and displaying the identified fingerprint registration progress rate.

According to various embodiments of the present disclosure, the displaying of the information on the fingerprint registration progress situation includes displaying a fingerprint image corresponding to the input fingerprint together with fingerprint registration progress rates based on information relating to the fingerprint registration progress situation whenever fingerprint of the user is received.

According to various embodiments of the present disclosure, changing a display attribute of the at least one fingerprint of the user includes: comparing the plurality of sequentially received fingerprints, identifying an overlapping fingerprint area and a non-overlapping fingerprint area of a currently received fingerprint according to a result the comparison, and differently setting display attributes of the overlapping fingerprint area and the non-overlapping fingerprint area.

According to various embodiments of the present disclosure, hanging a display attribute of the at least one fingerprint of the user further includes differently setting the display attribute of the overlapping fingerprint area according to an overlapping degree of the overlapping fingerprint area.

According to various embodiments of the present disclosure, registering the final fingerprint generated using the at least one of the plurality of sequentially received fingerprints includes: synthesizing the generated fingerprint images in correspondence to the plurality of sequentially received fingerprints, and registering the final fingerprint base on a fingerprint image within a predetermined radius from the most overlapping fingerprint area on the synthesized fingerprint image.

According to various embodiments of the present disclosure, the registering the final fingerprint generated using the at least one of the plurality of sequentially received fingerprints includes: setting a fingerprint area, which is to registered, based on a distribution of a plurality of feature points detected from the plurality of sequentially input fingerprints, and registering the final fingerprint of the user containing the set fingerprint area.

According to various embodiments of the present disclosure, the information on the fingerprint registration progress situation includes at least one of display form information, display attribute information, and fingerprint registration progress rate information of the plurality of sequentially received fingerprints.

According to various embodiments of the present disclosure, the method further includes: guiding a fingerprint input direction for the next fingerprint input based on information relating to the fingerprint registration progress situation.

According to various embodiments of the present disclosure, the guiding of the fingerprint input direction includes: identifying a location of a reference feature point detected from the previously received fingerprint of the user from the currently received fingerprint of the user; and guiding a fingerprint input direction for the next fingerprint input according to the identified location.

According to various embodiments of the present disclosure, the guiding of the fingerprint input direction includes: setting a central area of the currently received fingerprint of the user as a reference area; and guiding a fingerprint input direction for the next fingerprint input based on the reference area.

Hereinafter, various embodiments of the present disclosure will be described in detail with reference to the accompanying drawings based on a configuration and an operation of the above-described electronic device.

Figure 4:
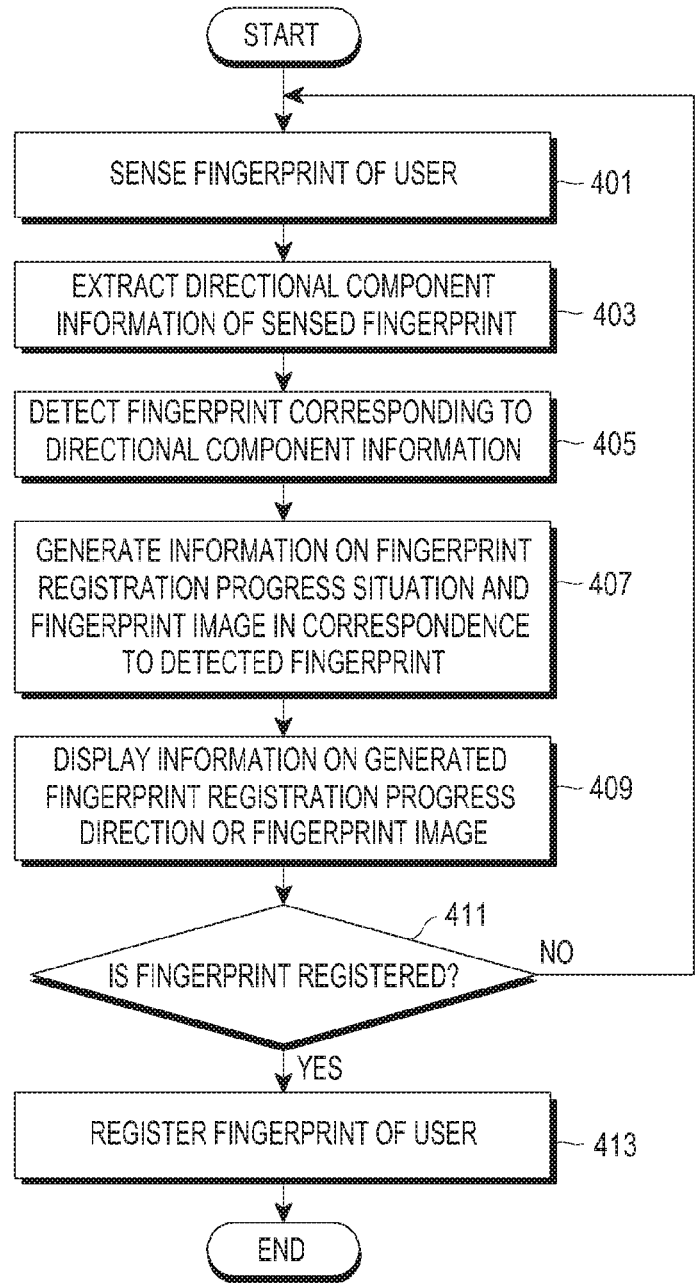
FIG. 4 illustrates an operation procedure of an electronic device according to various embodiments of the present disclosure.
Figure 5:
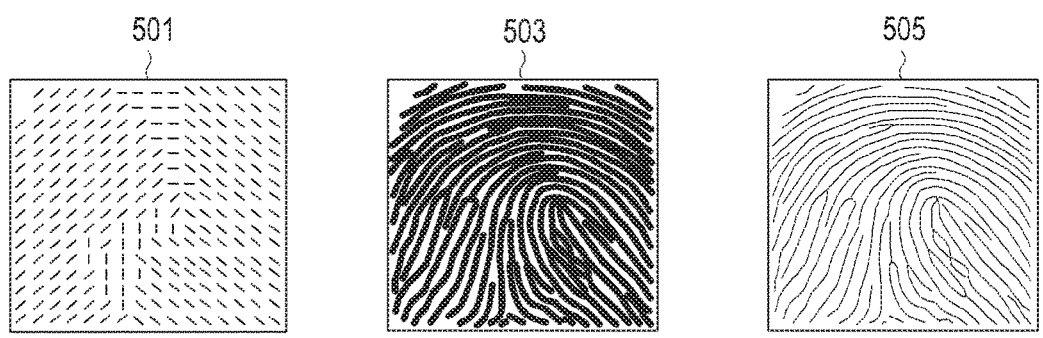
FIG. 5 illustrates fingerprint recognition in an electronic device according to various embodiments of the present disclosure.

FIG. 4 is a flowchart illustrating an operation procedure of an electronic device according to various embodiments of the present disclosure. FIG. 5 is a diagram illustrating fingerprint recognition in an electronic device according to various embodiments of the present disclosure.

Referring to FIGS. 4 and 5, according to an embodiment of the present disclosure, in operation 401, if the user inputs a fingerprint in one area of an electronic device, the electronic device (for example, the electronic device 101 of FIG. 1) may receive a fingerprint of the user that is detected through at least one sensor located in the one area.

According to various embodiments of the present disclosure, in the following operations, the electronic device may temporarily store a detected fingerprint, that is, an input fingerprint, and may process recognition of a fingerprint for the temporarily stored fingerprint. In operation 403, as illustrated in FIG. 5, the electronic device may extract directional component information 501 of the fingerprint shape in the recognized fingerprint.

In operation 405, as illustrated in FIG. 5, the electronic device may binarize 503 the extracted directional component information, and may detect a fingerprint corresponding to the directional component information, that is, may recognize the input fingerprint by classifying 505 the binarized fingerprint shape.

In operation 407, the electronic device may generate a fingerprint image corresponding to the recognized fingerprint and information on the fingerprint registration progress situation. According to various embodiments of the present disclosure, the electronic device may synthesize at least one previously generated fingerprint image and the currently generated image so that the recognized fingerprint may be viewed more clearly whenever the user inputs a fingerprint. The information on the fingerprint registration progress situation may be displayed by using a fingerprint image corresponding to the plurality of input fingerprints, that is, a fingerprint image of the actual user, and may include at least one of display form information of the plurality of fingerprints sequentially input (for example, at least one of a user fingerprint image, a gauge bar and a message), display attribute information (for example, at least one of shape, color, brightness, light and shade, contrast, size, width, height, area, density, margin, and transparency), and fingerprint registration progress rate information.

In operation 409, the electronic device may display information on the fingerprint registration progress situation in various schemes to inform the user of the generated fingerprint registration progress situation. Furthermore, the electronic device may display the generated fingerprint image according to the information on the fingerprint registration progress situation.

In operation 411, the electronic device may identify whether the fingerprint of the user is to be registered by using the recognized fingerprint, considering information on the generated fingerprint registration progress situation. In the identification result, when the fingerprint of the user is not registered by using the currently recognized fingerprint, the electronic device may repeatedly process recognition of a fingerprint for a fingerprint input next by performing operations 401 to 409 again. The fingerprint recognition processing operation may be repeated until the set condition is satisfied.

In operation 413, according to the result identified in operation 411, the electronic device may register a fingerprint of the user by using the currently recognized fingerprint and at least some of the plurality of fingerprints that have been recognized until now. According to various embodiments of the present disclosure, the electronic device may synthesize at least some of the plurality of processed fingerprints, and may register the synthetized fingerprint as a fingerprint of the user. According to various embodiments of the present disclosure, the electronic device may select at least one of the plurality of processed fingerprints, which is clearly recognized, for example, which has a high recognition rate, and may register the selected fingerprint as a fingerprint of the user. Furthermore, according to various embodiments of the present disclosure, when the electronic device processes the sequentially input fingerprints such that they become gradually clearer (for example, the fingerprint images corresponding to the sequentially processed fingerprints are displayed gradually densely, brightly, clearly, or realistically), the electronic device may register the finally processed fingerprint as a fingerprint of the user.

FIGS. 6A, 6B, 6C, 6D and 6E illustrate a fingerprint registration screen of an electronic device according to various embodiments of the present disclosure.

Figure 6:
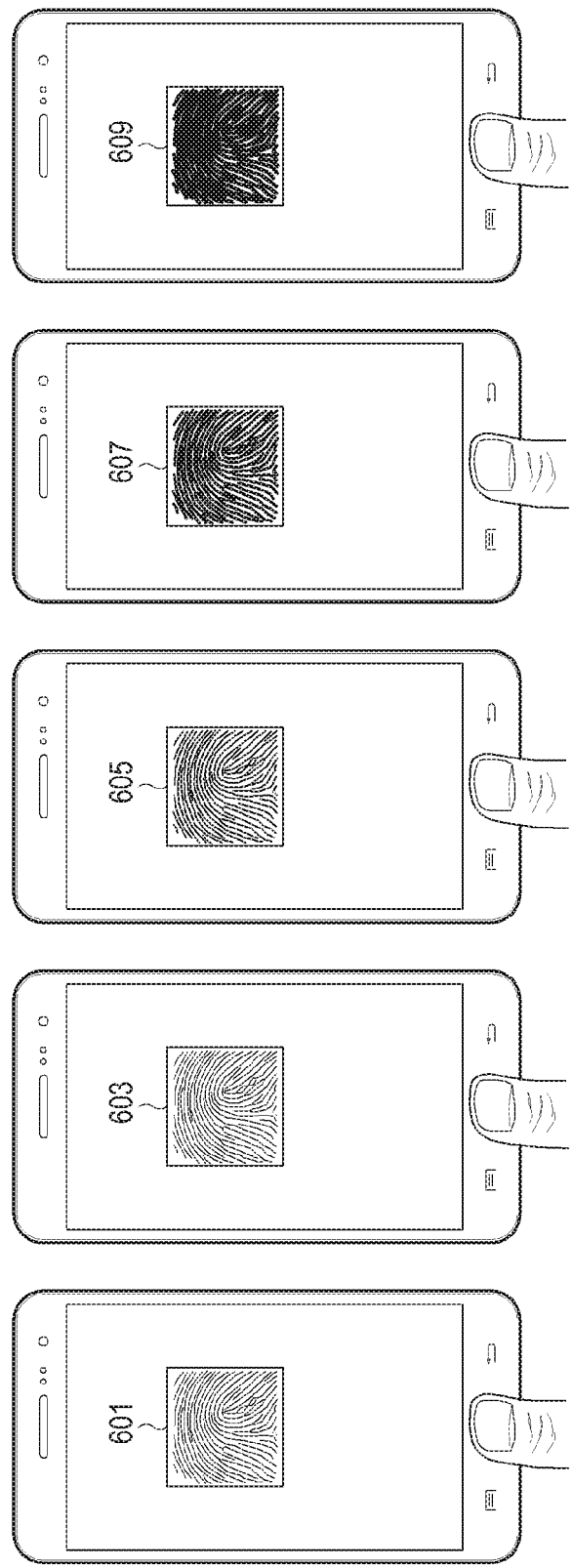
FIGS. 6A, 6B, 6C, 6D and 6E illustrate a fingerprint registration screen of an electronic device according to various embodiments of the present disclosure.

Referring to FIG. 6, according to various embodiments of the present disclosure, the electronic device (for example, the electronic device 101 of FIG. 1) may repeat an operation of inputting and recognizing a fingerprint by a predetermined number of times (for example, 5 times). According to various embodiments of the present disclosure, the number of times may be changed according to the fingerprint registration progress situation. For example, when a fingerprint is recognized clearly enough to register the fingerprint only with the currently recognized fingerprints or feature points corresponding to the number that is necessary for registration or more of a fingerprint are extracted based on the information on the fingerprint registration progress situation, the number of inputs of the fingerprint for recognition of the fingerprint may be changed. That is, when a fingerprint is recognized clearly enough to register the fingerprint only with the currently recognized fingerprints or feature points corresponding to the number that is necessary for registration or more of a fingerprint are extracted, the electronic device may register a fingerprint by using at least some of the plurality of fingerprints that have been recognized so far after input of a fingerprint of the user is stopped.

Referring back to FIG. 6, according to various embodiments of the present disclosure, the electronic device may sequentially display fingerprint images 601, 603, 605, 607 and 609 on an execution screen according to the operations as it repeats the operation of inputting a fingerprint and processing recognition of the fingerprint (FIGS. 6A to 6E). The electronic device may display the fingerprint images 601, 603, 605, 607 and 609 that are sequentially displayed whenever the fingerprint of the user is input such that the fingerprint images 601, 603, 605, 607 and 609 may become gradually dense by adjusting a display attribute of the image (for example, at least one of brightness, light and shade, chroma, contrast, and color). For example, a fingerprint of the user input first, that is, the fingerprint image 601 corresponding to a fingerprint shape is displayed blurredly, and the fingerprint images 603, 605, 607, and 609 corresponding to the fingerprints input later may be displayed sequentially densely. For example, the fingerprint image 601 corresponding to the fingerprint of the user input first may be displayed in the brightest color among the fingerprint images 603, 605, 607 and 609, and the fingerprint images may become darker sequentially so that the fingerprint image 609 corresponding to the fingerprint of the user input finally may be displayed at the darkest color among the fingerprint images 601, 603, 605, and 607.

According to various embodiments of the present disclosure, the fingerprint images 601, 603, 605, 607, and 609 may be displayed together with at least one piece of display form information of the gauge bar and the guide message.

FIGS. 7A, 7B, 7C, 7D and 7E illustrate a fingerprint registration screen of an electronic device according to various embodiments of the present disclosure.

Figure 7:
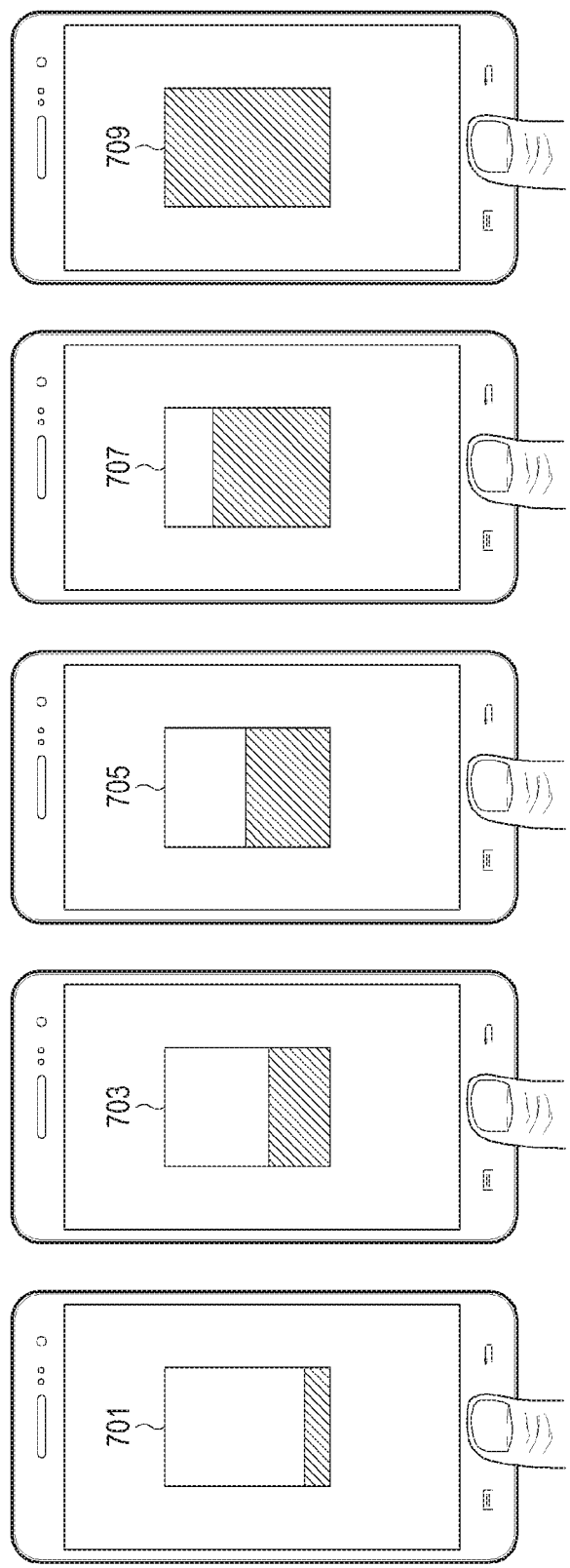
FIGS. 7A, 7B, 7C, 7D and 7E illustrate a fingerprint registration screen of an electronic device according to various embodiments of the present disclosure.

Referring to FIG. 7, according to various embodiments of the present disclosure, the electronic device (for example, the electronic device 101 of FIG. 1) may display the gauge bars 701, 703, 705, 707, and 709 according to the fingerprint registration progress rate, sequentially whenever the user inputs a fingerprint by using information on the fingerprint registration progress situation. The electronic device may identify a fingerprint registration progress rate contained in the information on the fingerprint registration progress situation according to a clearness of the plurality of input fingerprints, the areas of the recognized fingerprints, and the number of feature points that are detected from the recognized fingerprints, and may display the identified registration progress rates on the gauge bars 701, 703, 705, 707 and 709.

According to various embodiments of the present disclosure, the electronic device may set information on the fingerprint registration progress situation such that the fingerprint registration progress rate displayed on the gauge bar may not be increased in proportion to the number of fingerprint inputs of the user.

FIGS. 8A, 8B, 8C, 8D, 8E, 9, and 10 are diagrams illustrating a fingerprint registration screen of an electronic device according to various embodiments of the present disclosure.

Figure 8:
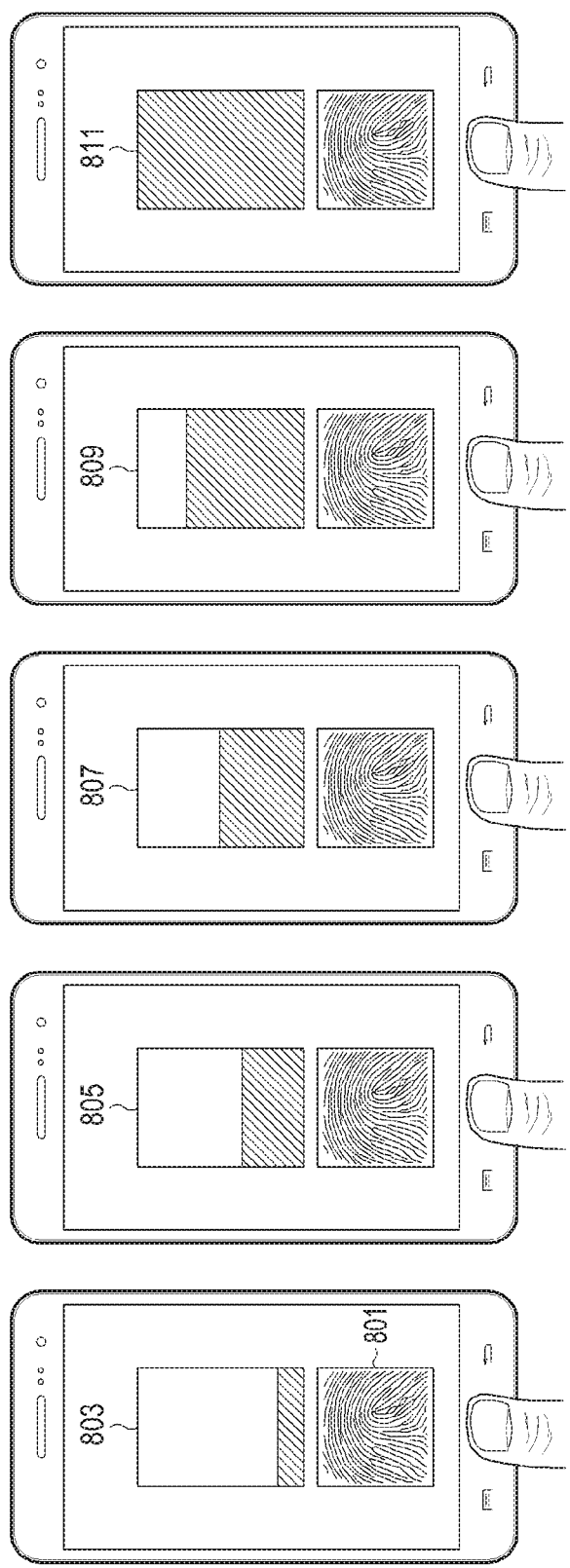
FIGS. 8A, 8B, 8C, 8D and 8E illustrate a fingerprint registration screen of an electronic device according to various embodiments of the present disclosure.

Referring to FIG. 8, according to various embodiments of the present disclosure, the electronic device (for example, the electronic device 101 of FIG. 1) may display the gauge bars 803, 805, 807, 809, and 811 together with at least one piece of display form information of at least one fingerprint image 801 generated whenever the user inputs a fingerprint, the fingerprint images 601, 603, 605, 607, and 609 of FIG. 6, and a guide message.

Figure 9:
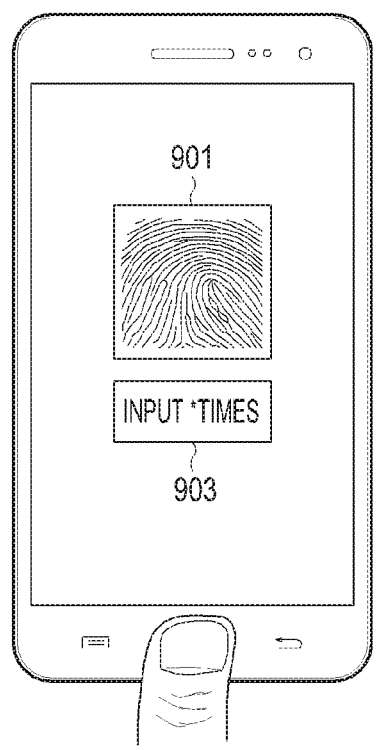
FIG. 9 illustrates a fingerprint registration screen of an electronic device according to various embodiments of the present disclosure.
Figure 10:
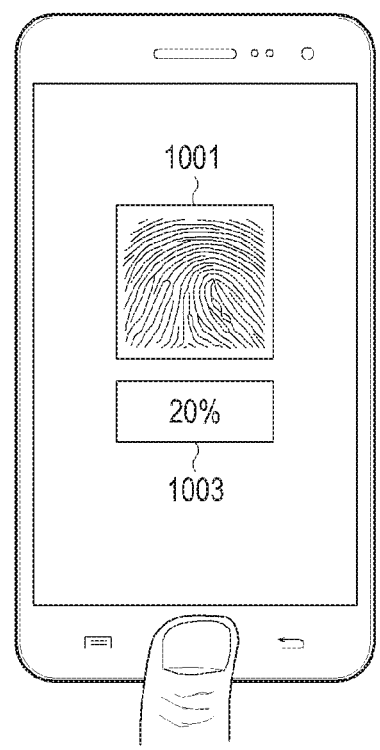
FIG. 10 illustrates a fingerprint registration screen of an electronic device according to various embodiments of the present disclosure.
Figure 11A:
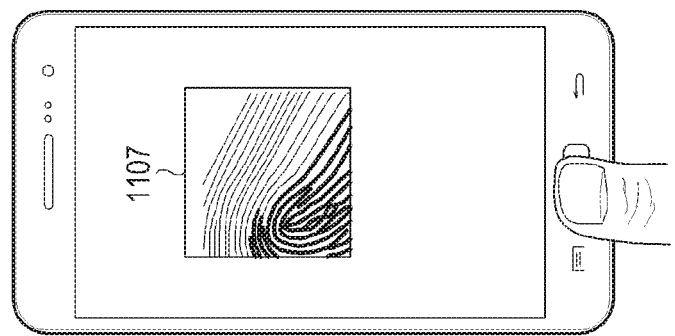
FIGS. 11A, 11B, 11C and 11D illustrate a fingerprint registration screen of an electronic device according to various embodiments of the present disclosure.
Figure 11B:
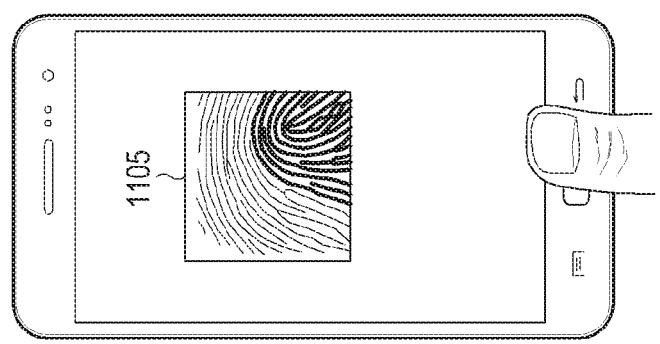
Figure 11C:
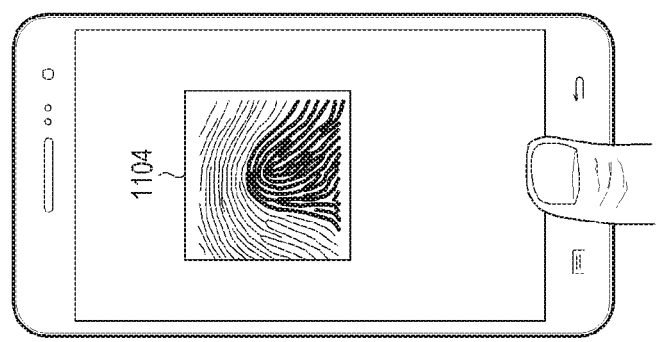
Figure 11D:
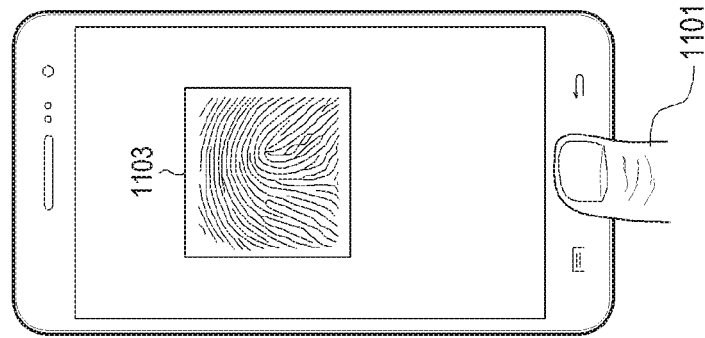

Referring to FIGS. 9 and 10, according to various embodiments of the present disclosure, the electronic device (for example, the electronic device 101 of FIG. 1) may display at least one fingerprint image 901 or 1001 generated whenever the user inputs a fingerprint together with a guide message 903 or 1003. According to various embodiments of the present disclosure, for example, the electronic device may display at least one of the number of inputs and a fingerprint registration progress rate in at least one guide message 903 or 1003 of a text and a sound source.

FIGS. 11A, 11B, 11C, 11D and 12 are diagrams illustrating a fingerprint registration screen of an electronic device according to various embodiments of the present disclosure.

Referring to FIG. 11, according to various embodiments of the present disclosure, the electronic device (for example, the electronic device 101 of FIG. 1) may set display attributes (for example, light and shade, brightness, and color) of an overlapping fingerprint area and a non-overlapping fingerprint area in a fingerprint image generated in correspondence to an input fingerprint 1101 differently and may display fingerprint images 1103, 1104, 1105, and 1106, sequentially whenever the user inputs a fingerprint, by using information on the fingerprint registration progress situation.

According to various embodiments of the present disclosure, the electronic device may compare a fingerprint image 1103 corresponding to an initially input fingerprint and a fingerprint image corresponding to the next input fingerprint to identify an overlapping fingerprint area, and may display the overlapping fingerprint area, for example, the densely set fingerprint image 1104. The electronic device compares a fingerprint image corresponding to a fingerprint that is repeatedly input next and the previous fingerprint image to display a fingerprint image 1105 in which the overlapping fingerprint area is set more clearly (for example, more densely, more brightly, more distinctly, or more realistically).

According to various embodiments of the present disclosure, the electronic device may display the repeatedly recognized fingerprint areas of the sequentially displayed fingerprint images more clearly (for example, gradually densely, gradually brightly, gradually distinctly, or gradually realistically) according to the overlapping degree and to display an area that is not repeatedly recognized, that is, a newly recognized fingerprint area blurredly. According to various embodiments of the present disclosure, the electronic device may differently display colors (for example, a fingerprint area that is recognized once is displayed by a black color, a fingerprint area that is recognized twice is displayed by an orange color, and a fingerprint area that is recognized three times is displayed by a red color) according to the degree by which the area recognized as overlapping overlaps. In addition, the electronic device may differently display a repeatedly recognized fingerprint area and a newly recognized fingerprint area according to various display schemes.

According to various embodiments of the present disclosure, the electronic device may synthesize at least some of fingerprint images corresponding to the plurality of recognized fingerprints, and may register a fingerprint image within a predetermined radius from the most overlapping fingerprint area in the synthesized fingerprint image as a fingerprint of the user.

Figure 12:
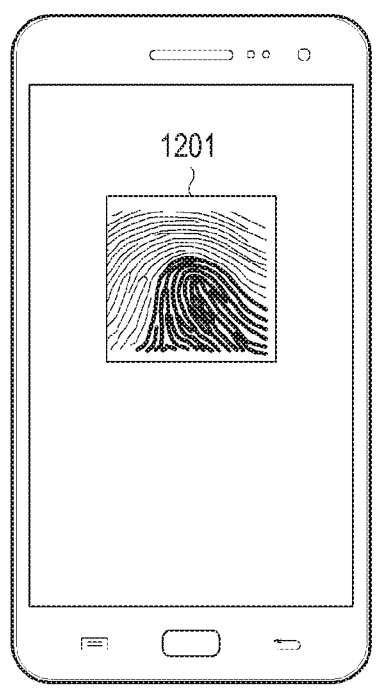
FIG. 12 illustrates a fingerprint registration screen of an electronic device according to various embodiments of the present disclosure.

Referring to FIG. 12, according to various embodiments of the present disclosure, the electronic device (for example, the electronic device 101 of FIG. 1) may generate a final fingerprint image 1201 corresponding to a fingerprint of the user that is to be registered, by synthesizing fingerprint images that are set according to information on the fingerprint registration progress situation of FIG. 11. According to various embodiments of the present disclosure, the electronic device may arrange the most overlapping fingerprint area (for example, a fingerprint area having the densest color) at the center of the display area to generate the final fingerprint image.

Figure 13:
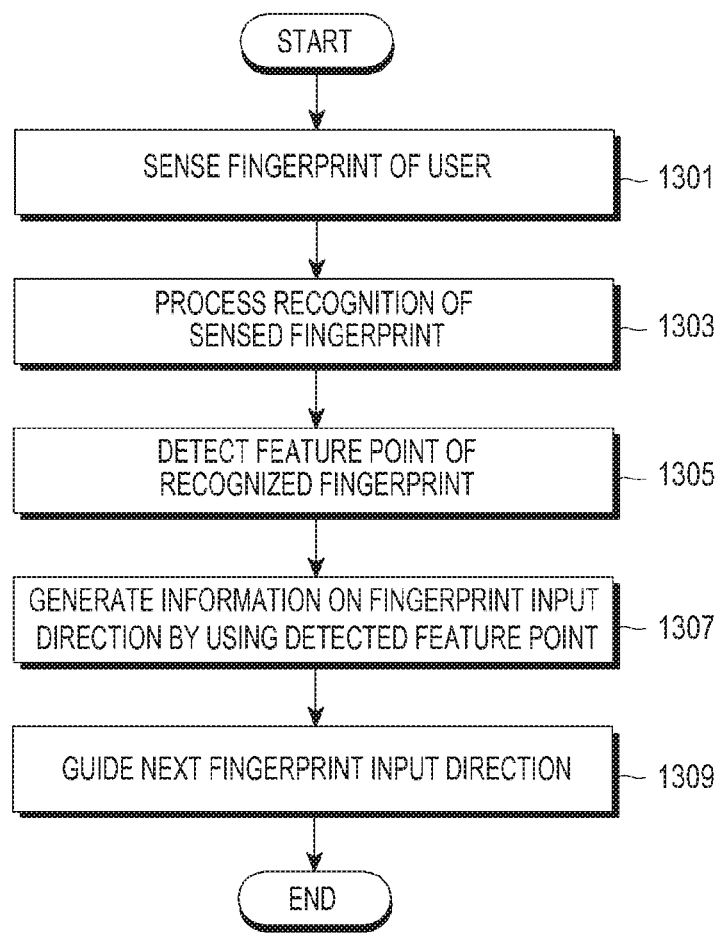
FIG. 13 illustrates an operation procedure of an electronic device according to various embodiments of the present disclosure.

FIG. 13 is a flowchart illustrating an operation procedure of an electronic device according to various embodiments of the present disclosure.

Referring to FIG. 13, according to various embodiments of the present disclosure, in operation 1301, if the user inputs a fingerprint in one area of an electronic device, the electronic device (for example, the electronic device 101 of FIG. 1) may receive a fingerprint of the user that is detected through at least one sensor located in the one area.

In operation 1303, the electronic device may temporarily store the detected fingerprint, that is, the input fingerprint, and may process recognition of a fingerprint for the temporarily stored fingerprint. Operation 1303 may be applied in the same manner as operations 403 to 407 of FIG. 4, and accordingly, a detailed description thereof will be omitted.

In operation 1305, the electronic device may detect at least one feature point of the recognized fingerprint. According to various embodiments of the present disclosure, the electronic device may detect the shape of a central area of a fingerprint in the recognized fingerprint as a feature point or may detect the shape showing a unique quality as a feature point by analyzing the shape of the recognized fingerprint.

In operation 1307, the electronic device may generate information (hereinafter, referred to as information on a fingerprint input direction) related to guide a fingerprint input direction by using at least one detected feature point.

In operation 1309, the electronic device may guide an input direction of a fingerprint that is to be input next by using information on the generated fingerprint input direction.

FIGS. 14A, 14B, 14C, 14D and 14E illustrate a fingerprint registration screen of an electronic device according to various embodiments of the present disclosure.

Figures 14A, 14B, 14C, 14D, 14E:
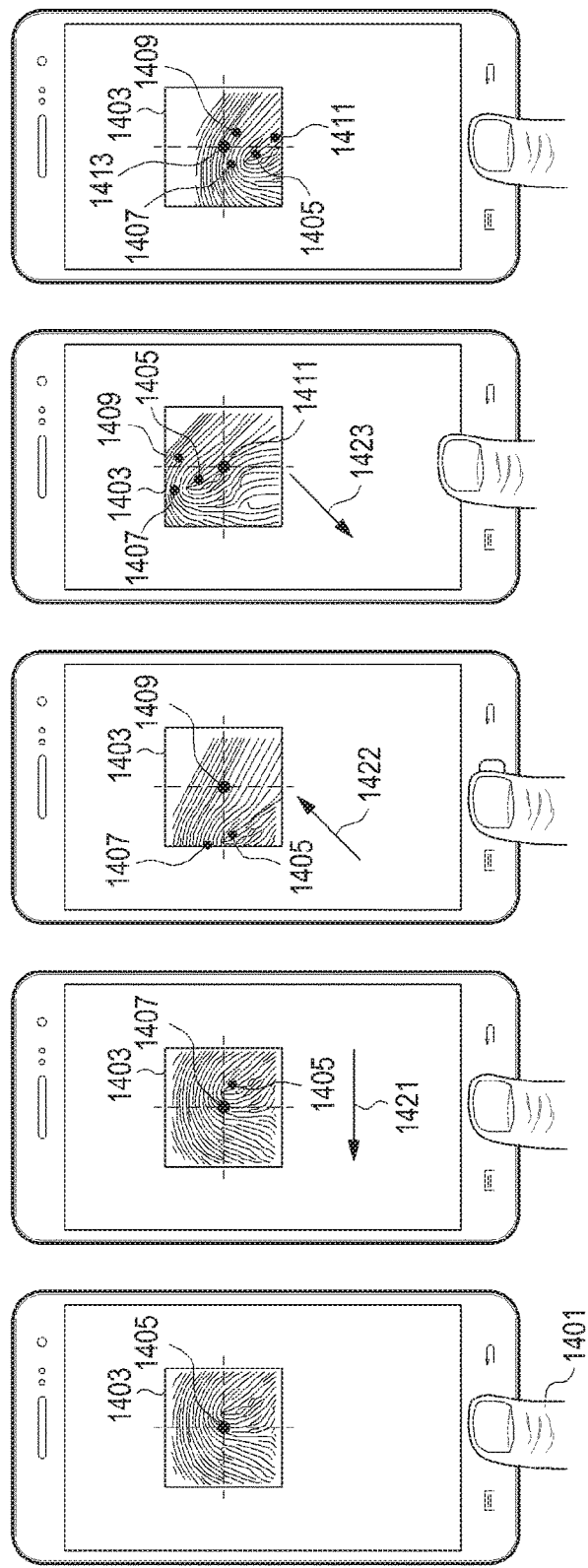
FIGS. 14A, 14B, 14C, 14D and 14E illustrate a fingerprint registration screen of an electronic device according to various embodiments of the present disclosure.

Referring to FIG. 14, the electronic device (for example, the electronic device 101 of FIG. 1) according to various embodiments of the present disclosure may detect a fingerprint shape of the central area as a feature point 1405 in the fingerprint input first, for example, as illustrated in FIG. 14A, as the user inputs 1401 a fingerprint. The electronic device may detect the shape of the central area in the next input fingerprint as a feature point 1407, and may identify a location of the feature point 1405 that is detected before with respect to the detected feature point 1407. In the identification result, when the location of the previously detected feature point 1405 is located in a lower-left area (for example, a fourth area) as illustrated in FIG. 14B, the electronic device may further recognize a right fingerprint area of a finger of the actual user and may guide the fingerprint input direction to the left side 1421 to further recognize a left fingerprint area.

The electronic device may detect a feature point 1409 in the fingerprint input again, and may identify a location of the feature point 1405 or 1407 that is detected before with respect to the detected feature point 1409. In the identification result, when the location of at least one feature point 1405 or 1407 detected previously is located in a right area (for example, a second or third area) as illustrated in FIG. 14C, a fingerprint area of the left side of the finger of the actual user may be further recognized, and at least one of an upper-right direction 1422 or an upper direction may be guided as the fingerprint input direction to further recognize at least one fingerprint area of a right area and an upper area. In the same operations as those of FIGS. 14A, 14B, and 14C, the electronic device may further detect at least one feature point 1411 or 1413 as in at least one of FIGS. 14D and 14E, and the next fingerprint input direction (for example, a left lower direction 1423) may be guided with respect to the at least one detected feature point 1411 or 1413.

Figure 15:
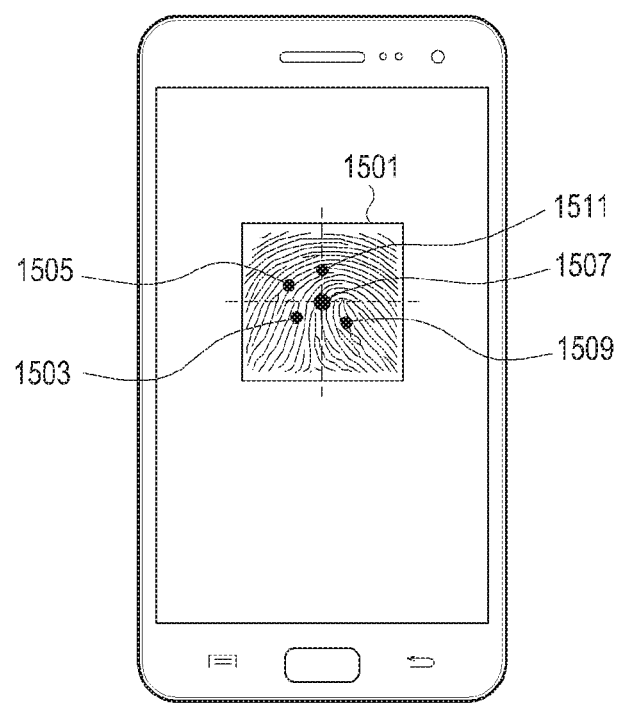
FIG. 15 illustrates a fingerprint registration screen of an electronic device according to various embodiments of the present disclosure.

FIG. 15 is a diagram illustrating a fingerprint registration screen of an electronic device according to various embodiments of the present disclosure.

Referring to FIG. 15, according to various embodiments of the present disclosure, the electronic device (for example, the electronic device 101 of FIG. 1) may set a fingerprint image 1501 including the detected feature points 1503, 1505, 1507, 1509, and 1511 and may display the fingerprint image 1501 on an execution screen according to the operation described in FIG. 14. According to various embodiments of the present disclosure, the electronic device may identify feature points included in the fingerprint image based on a fingerprint image (for example, the fingerprint image 1403 of FIG. 14E) corresponding to the finally input fingerprint and set a fingerprint area that is to be registered based on a distribution of the feature points, and may register a fingerprint of the user including the set fingerprint area. According to various embodiments of the present disclosure, the electronic device may arrange a feature point (for example, the feature point 1507) located at the center of a set area to generate a final fingerprint image 1501 corresponding to a fingerprint that is to be registered as the final user fingerprint, may register the generated final fingerprint image 1501 as a user fingerprint, and may display the generated final fingerprint image 1501 on the execution screen.

Although the fingerprint shape located at the center of the display area is detected as a feature point for convenience of description in various embodiments of the present embodiments of the present disclosure illustrated in FIGS. 14 and 15, the present disclosure is not limited thereto and the location of a feature point that is referenced according to the next user fingerprint input may be identified with reference to the detected feature point located in another area of the display area by detecting the feature point.

FIGS. 16A, 16B, 16C, 16D and 16E illustrate a fingerprint registration screen of an electronic device according to various embodiments of the present disclosure.

Figure 16:
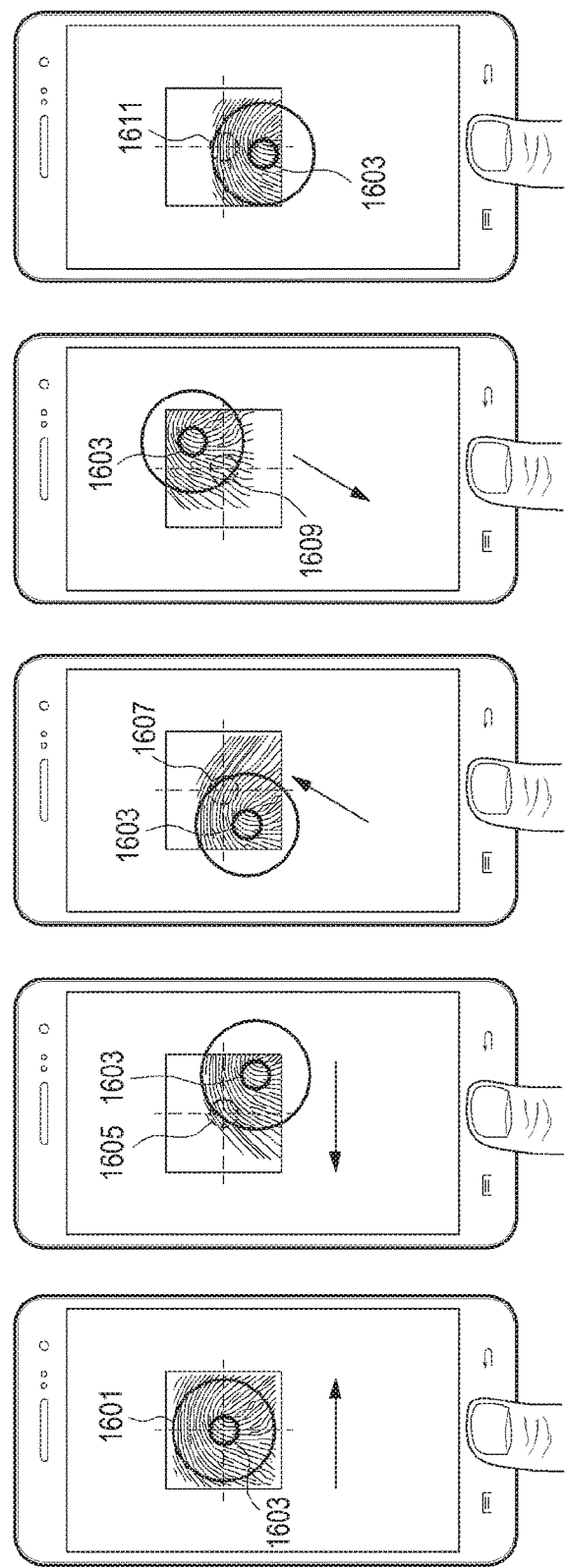
FIGS. 16A, 16B, 16C, 16D and 16E illustrate a fingerprint registration screen of an electronic device according to various embodiments of the present disclosure.

Referring to FIG. 16, according to various embodiments of the present disclosure, the electronic device (for example, the electronic device 101 of FIG. 1) may set, for example, a central area (or a center point) 1603 in a fingerprint input first as the user inputs a fingerprint, and may form a circle 1601 of a fingerprint area with reference to a predetermined radius of the central area.

The electronic device may identify the location of the central area 1603 with respect to the central area 1605, 1607, 1609, or 1611 of the currently input fingerprint as the user inputs the next fingerprint, and may guide a fingerprint input direction according to the location of the central area 1603. The fingerprint input direction may be set, for example, to at least one of 4 directions, 8 directions, and 16 directions, but the present disclosure may not be limited thereto and the fingerprint input direction may be set in various directions.

According to various embodiments of the present disclosure of FIG. 16, the electronic device may synthesize all the fingerprint images corresponding to the plurality of fingerprints input according to the guided fingerprint input direction to generate a fingerprint image that is to be finally registered. The fingerprint image that is to be finally registered is a fingerprint image having a wide area, and because a failure probability of a fingerprint input may be decreased even if the user inputs a fingerprint in any direction when the electronic device is driven or a function of an application is executed through the following recognition of a fingerprint, a fingerprint recognition rate can be increased. FIGS. 17A, 17B, 17C, 17D, 17E and 18 are diagrams illustrating a fingerprint registration screen of an electronic device according to various embodiments of the present disclosure.

Figure 17:
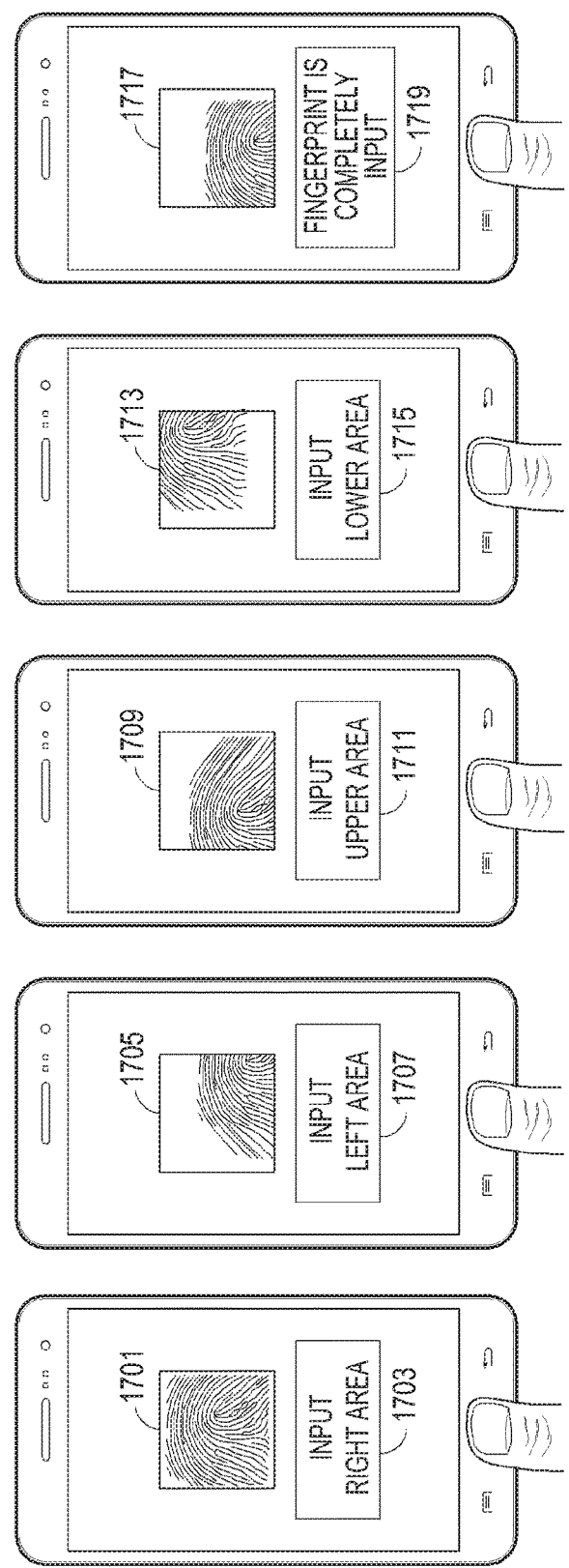
FIGS. 17A, 17B, 17C, 17D and 17E illustrate a fingerprint registration screen of an electronic device according to various embodiments of the present disclosure.

Referring to FIG. 17, according to various embodiments of the present disclosure, the electronic device (for example, the electronic device 101 of FIG. 1) may identify feature points in a fingerprint input first as the user inputs a fingerprint, and may generate a guide message for the next fingerprint input based on the identified feature points. The electronic device may store and display a fingerprint image 1701 for a fingerprint input to the execution screen of the display unit, and may display a guide message 1703 (for example, "Input right area") that guides the next fingerprint input or output the guide message 1703 as a sound source.

If the user inputs a fingerprint again according to the guide message 1703, the electronic device may store and display the fingerprint image 1705 for the input fingerprint. For example, if the user inputs a right area of a finger again according to the guide message 1703, a fingerprint of the right area of the finger may be displayed as in the fingerprint image 1705. The electronic device may identify feature points in the input fingerprint, and may generate a guide message 1707 that guides the next fingerprint input based on the identified feature point and display the generated guide message 1707. According to various embodiments of the present disclosure, the electronic device may compare the identified feature points and the previous feature points to set a fingerprint input direction, and may generate and display a guide message 1707 (for example, "Input left area") that guides the next fingerprint input according to the set fingerprint input direction.

If the user inputs, for example, a fingerprint of a left area of a finger according to the guide message 1707 again, the electronic device may store and display a fingerprint image 1709 for a fingerprint of a left area of a finger, and may generate and display a guide message 1711 (for example, "Input upper area") for inputting a fingerprint according to the set fingerprint input direction by setting a fingerprint input direction as described above.

If the user inputs, for example, a fingerprint of an upper area of a finger according to the guide message 1707 again, the electronic device may store and display a fingerprint image 1713 for a fingerprint of an upper area of a finger, and may generate and display a guide message 1715 (for example, "Input lower area") for inputting a fingerprint according to the set fingerprint input direction by setting a fingerprint input direction as described above.

If the user inputs a fingerprint, for example, of a lower area of a finger according to the guide message 1707 again, the electronic device may store and display a fingerprint image 1717 for the fingerprint of a lower area of the finger, and as described above, may compare the previously identified feature points and the currently identified feature points to determine whether a fingerprint of the entire area of the finger is input when a fingerprint input direction is set. If it is determined that the fingerprint of the entire area of the finger is input, the electronic device may perform a control to stop inputting a fingerprint without setting a next fingerprint input direction. According to various embodiments of the present disclosure, the electronic device may display a guide message 1719 (for example, "Fingerprint is completely input") for guiding completion of input of a fingerprint. Meanwhile, if it is determined that the entire area of the fingerprint is not input, the electronic device may set the next fingerprint input direction, and may generate and display a guide message according to the set fingerprint input direction as described above.

Figure 18:
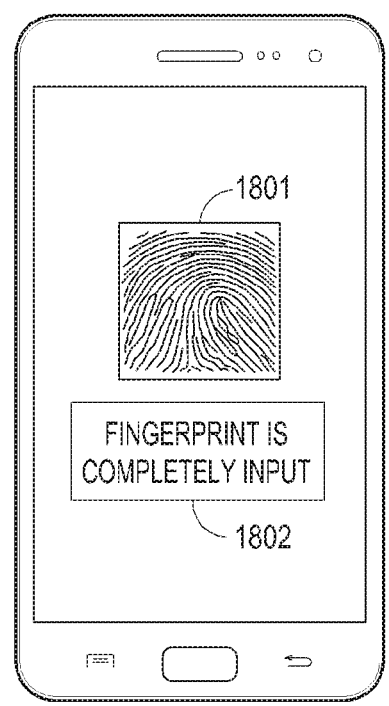
FIG. 18 illustrates a fingerprint registration screen of an electronic device according to various embodiments of the present disclosure.

Referring to FIG. 18, according to various embodiments of the present disclosure, the electronic device may synthesize all the stored fingerprint images to generate the finally registered fingerprint image 1801 according to the guide message 1719 for guiding completion of the input of the fingerprint. The electronic device may register a fingerprint image 1801 that is to be registered finally, and may display a guide message 1802 (for example, "Fingerprint is completely registered) for guiding completion of registration of a fingerprint. The fingerprint image that is to be finally registered is a fingerprint image having a wide area, and because a failure probability of a fingerprint input may be decreased even if the user inputs a fingerprint in any direction when the electronic device is driven or a function of an application is executed through the following recognition of a fingerprint, a fingerprint recognition rate can be increased.

According to various embodiments of the present disclosure, the electronic device (for example, the electronic device 101 of FIG. 1) may guide a fingerprint input direction to the user as described above when a fingerprint of the user is not input at a central location of at least one sensor area included in the electronic device and the recognition of a fingerprint fails.

Although it has been described in various embodiments of the present disclosure described above that the electronic device guides the next fingerprint input direction by using a feature point, the present disclosure is not limited thereto and the electronic device may guide a fingerprint input direction of the user by using an area of the input fingerprint of the user. According to various embodiments of the present disclosure, if a margin (empty space) is present in an area that displays a fingerprint image corresponding to the fingerprint of the user, the electronic device may identify an area of a fingerprint that is input through the margin. According to various embodiments of the present disclosure, when an area for recognition of a fingerprint includes a plurality of sensors, the electronic device may identify an area of the fingerprint of the user that is input based on signals received from a plurality of sensors that recognize a fingerprint. In addition, an area of a fingerprint of the user that is input through various schemes may be identified.

In the above-mentioned embodiments of FIGS. 14, 16, and 17, when the electronic device sequentially displays fingerprint images for the sequentially input fingerprints while guiding the next fingerprint input direction, it may sequentially display fingerprint images that are to be displayed, more clearly (for example, gradually densely, gradually brightly, gradually distinctly, or gradually realistically), or may display a fingerprint image as in the embodiment of FIG. 7.

FIGS. 19A, 19B, 19C, 19D and 19E illustrate a fingerprint registration screen of an electronic device according to various embodiments of the present disclosure.

Figure 19:
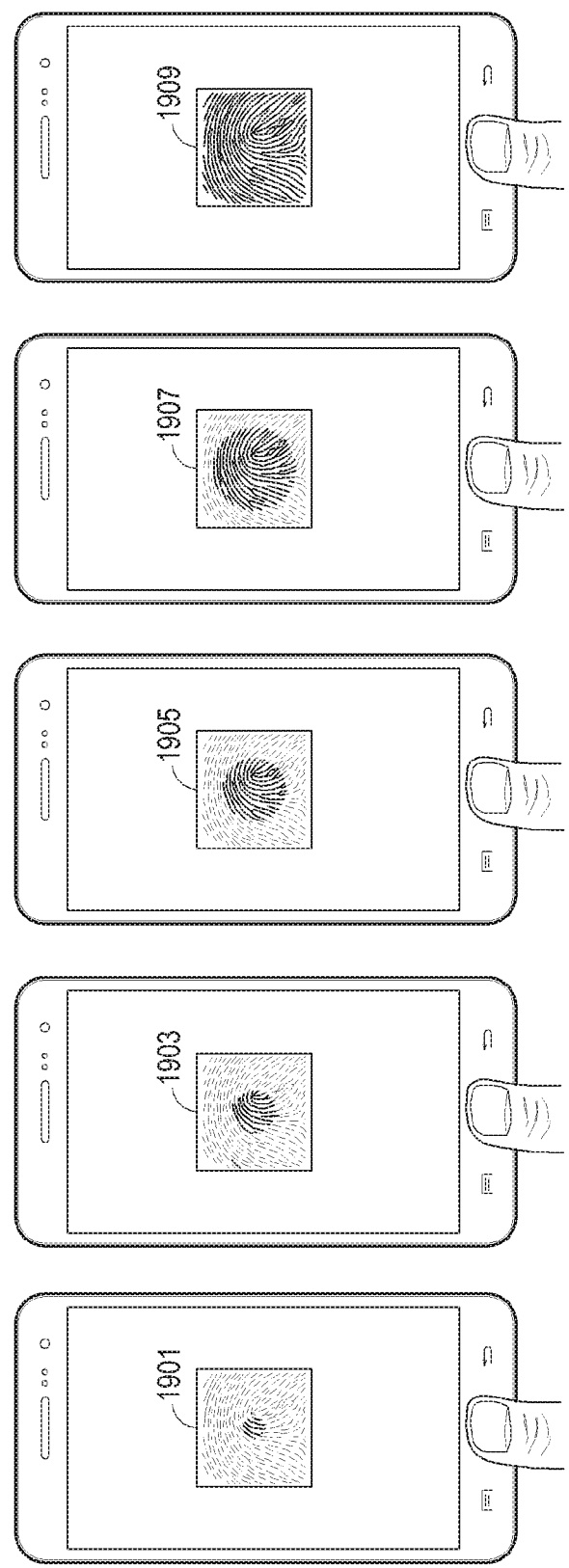
FIGS. 19A, 19B, 19C, 19D and 19E illustrate a fingerprint registration screen of an electronic device according to various embodiments of the present disclosure.

Referring to FIG. 19, according to various embodiments of the present disclosure, the electronic device (for example, the electronic device 101 of FIG. 1) may sequentially display fingerprint images 1901, 1903, 1905, 1907 and 1909 on an execution screen according to the operations as the operations of inputting a fingerprint and processing recognition of the fingerprint are repeated (FIGS. 6A to 6E). The electronic device may display the fingerprint images 1901, 1903, 1905, 1907 and 1909 that are sequentially displayed whenever the fingerprint of the user is input such that the fingerprint images 1901, 1903, 1905, 1907 and 1909 may become gradually bright or distinct sequentially by adjusting a display attribute of the image (for example, at least one of brightness, light and shade, chroma, contrast, and color). For example, a fingerprint of the user input first, that is, the fingerprint image 601 corresponding to a fingerprint shape is displayed blurredly or unclearly, and the fingerprint images 1901, 1903, 1905, 1907, and 1909 corresponding to the fingerprints input later may be displayed sequentially brightly or distinctly. A clearness (for example, brightness or distinctness) of the displayed fingerprint image may be adjusted according to the fingerprint registration progress rate.

According to various embodiments of the present disclosure, the electronic device may sequentially display an area of a fingerprint shape while enlarging the area in fingerprint images 1901, 1903, 1905, 1907, and 1909 that are sequentially displayed brightly or distinctly.

According to various embodiments of the present disclosure, the electronic device may sequentially display the entire fingerprint shape or a portion of the fingerprint shape of the sequentially displayed fingerprint images gradually brightly or distinctly.

According to various embodiments of the present disclosure, the electronic device may display at least one piece of display form information as a gauge bar and a guide message together with the fingerprint images 1901, 1903, 1905, 1907, and 1909 on the displayed execution screen.

Figure 20:
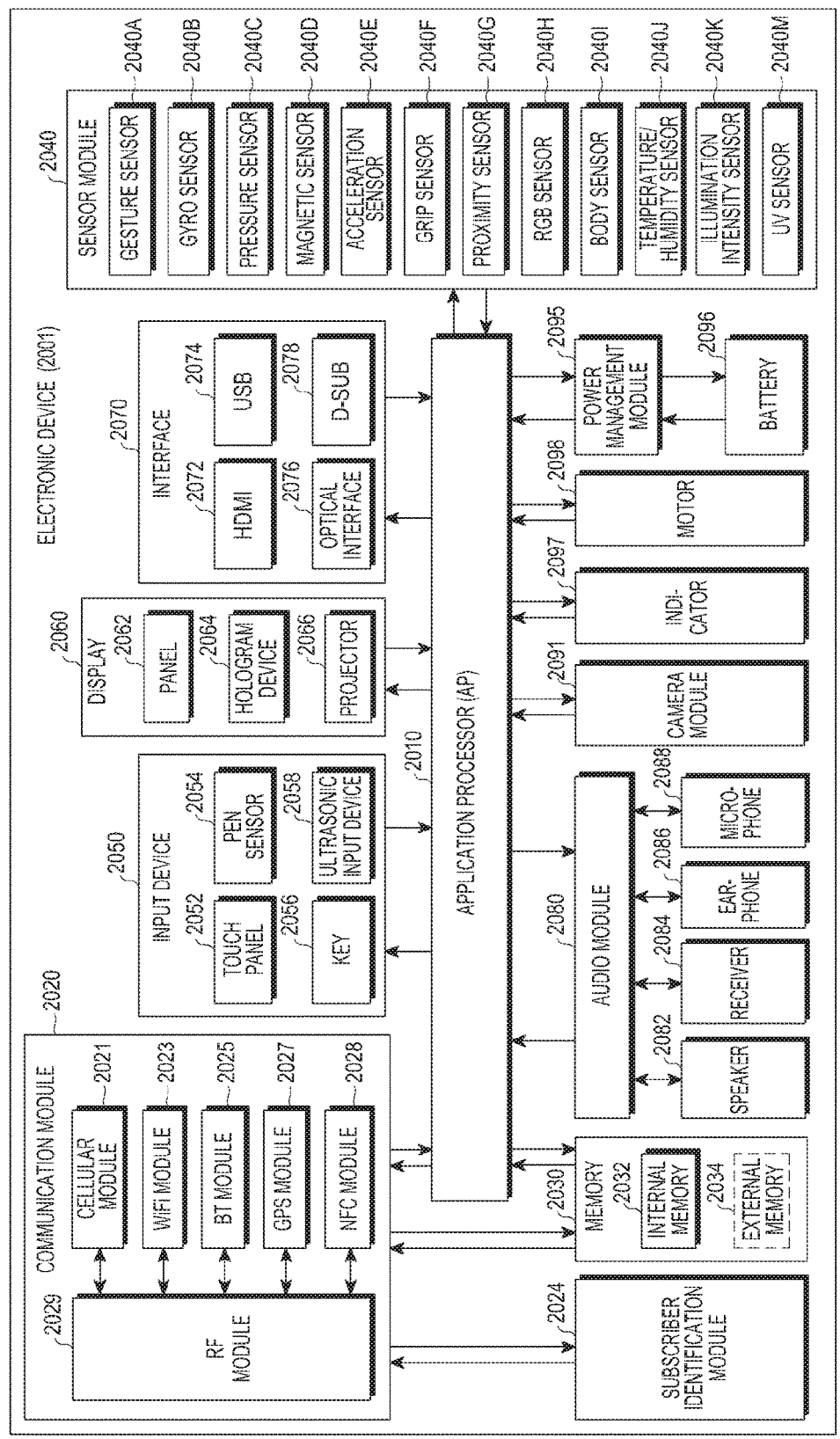
FIG. 20 illustrates a detailed structure of an electronic device according to an embodiment of the present disclosure.

FIG. 20 illustrates a block diagram of an electronic device 2001 according to various embodiments of the present disclosure. The electronic device 2001 may form, for example, a part or the entirety of the electronic device 101 illustrated in FIG. 1. Referring to FIG. 20, the electronic device 2001 may include at least one Application Processor (AP) 2010, a communication module 2020, a Subscriber Identifier Module (SIM) card 2024, a memory 2030, a sensor module 2040, an input device 2050, a display 2060, an interface 20270, an audio module 2080, a camera module 2091, a power management module 2095, a battery 2096, an indicator 2097, and a motor 2098.

The at least one application processor 2010 may have the same or similar structure to the controller 110 of FIG. 1. For example, the AP 2010 may control a plurality of hardware or software components connected thereto by driving an operating system or an application program and perform a variety of data processing and calculations. The at least one AP 2010 may be implemented as, for example, a System on Chip (SoC). According to an embodiment of the present disclosure, the AP 2010 may further include a Graphical Processing Unit (GPU) and/or an image signal processor. The least one AP 2010 may include at least some of the components (for example, a cellular module 2021) illustrated in FIG. 20. The at least one AP 2010 may load instructions or data, received from at least one other component (for example, a non-volatile memory), in a volatile memory to process the loaded instructions or data, and may store various types of data in a non-volatile memory.

The communication module 2020 may have, for example, the same or similar configuration to the communication unit (not illustrated) described in FIG. 1. The communication module 2020 may include, for example, a cellular module 2021, a Wi-Fi module 2023, a BT module 2025, a GPS module 2027, an NFC module 2028, and a Radio Frequency (RF) module 2029.

The cellular module 2021 may provide a voice call, video call, text message services, or Internet services through, for example, a communication network. According to an embodiment of the present disclosure, the cellular module 2021 may identify and authenticate electronic devices 2001 within a communication network by using a subscriber identification module (for example, the SIM card 2024). According to an embodiment of the present disclosure, the cellular module 2021 may perform at least some of the functions which may be provided by the at least one AP 2010. According to an embodiment of the present disclosure, the cellular module 2021 may include a communication processor (CP).

The Wi-Fi module 2023, the BT module 2025, the GPS module 2027, and the NFC module 2028 may include, for example, a processor for processing data transmitted/received through the corresponding module. According to any embodiment, at least some (for example, two or more) of the cellular module 2021, the Wi-Fi module 2023, the BT module 2025, the GPS module 2027, and the NFC module 2028 may be included in one Integrated Chip (IC) or IC package.

The RF module 2029 may transmit/receive, for example, a communication signal (for example, an RF signal). The RF module 2029 may include, for example, a transceiver, a Power Amp Module (PAM), a frequency filter, a Low Noise Amplifier (LNA), or an antenna. According to another embodiment of the present disclosure, at least one of the cellular module 2021, the Wi-Fi module 2023, the BT module 2025, the GPS module 2027, and the NFC module 2028 may transmit/receive an RF signal through a separate RF module.

The SIM card 2024 may include, for example, a card including a subscriber identification module and/or an embedded SIM, and may further include unique identification information (for example, an Integrated Circuit Card Identifier (ICCID)) or subscriber information (for example, International Mobile Subscriber Identity (IMSI)).

The memory 2030 may have the same or similar structure to the storage unit 130 of FIG. 1. The memory 2030 may include, for example, an internal memory 2032 or an external memory 2034. The internal memory 2032 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a flash memory (for example, a NAND flash memory or a NOR flash memory), a hard drive, or a Solid State Drive (SSD).

The external memory 2034 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 2034 may be functionally and/or physically connected to the electronic device 2001 through various interfaces.

The sensor module 2040 may have, for example, the same or similar configuration to the fingerprint input unit 121 of FIG. 1, and may sense input information (for example, a gesture input) corresponding to a command for transmitting information related to at least one object. The sensor module 2040 may measure, for example, a physical quantity or detect an operation state of the electronic device 2001, and may convert the measured or detected information to an electrical signal. The sensor module 2040 may include, for example, at least one of a gesture sensor 2040A, a gyro sensor 2040B, an atmospheric pressure sensor 2040C, a magnetic sensor 2040D, an acceleration sensor 2040E, a grip sensor 2040F, a proximity sensor 2040G, a color sensor 2040H (for example, red, green, and blue (RGB) sensor), a biometric sensor 2040I, a temperature/humidity sensor 2040J, an illumination sensor 2040K, and an Ultra Violet (UV) sensor 2040M. Additionally or alternatively, the sensor module 2040 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 2040 may further include a control circuit for controlling at least one sensor included therein. In some embodiments of the present disclosure, the electronic device 2001 may further include a processor configured to control the sensor module 2040 as a part of or separately from the at least one AP 2010, and may control the sensor module 2040 while the at least one AP 2010 is in a sleep state.

The input device 2050 may have, for example, the same or similar configuration to the input unit 120 of FIG. 1, and may include, for example, a touch panel 2052, a (digital) pen sensor 2054, a key 2056, or an ultrasonic input device 2058. The touch panel 2052 may use at least one of, for example, a capacitive type, a resistive type, an infrared type, and an ultrasonic type. The touch panel 2052 may further include a control circuit. The touch panel 2052 may further include a tactile layer, and provide a tactile reaction to a user.

The (digital) pen sensor 2054 may include, for example, a recognition sheet which is a part of the touch panel or a separate recognition sheet. The key 2056 may include, for example, a physical button, an optical key or a keypad. The ultrasonic input device 2058 may detect an acoustic wave using a microphone (for example, the microphone 2088) of the electronic device 2001 through an input tool generating an ultrasonic signal to identify data.

The display 2060 may have the same or similar configuration to the display unit 140 of FIG. 1. The display 2060 may include a panel 2062, a hologram 2064, or a projector 2066. The panel 2062 may include a component equal or similar to the display 160 of FIG. 1. The panel 2062 may be embodied to be, for example, flexible, transparent, or wearable. The panel 2062 may also be configured to be integrated with the touch panel 2052 as a single module. The hologram device 2064 may show a stereoscopic image in the air by using interference of light. The projector 2066 may project light onto a screen to display an image. For example, the screen may be located inside or outside the electronic device 2001. According to an embodiment of the present disclosure, the display 2060 may further include a control circuit for controlling the panel 2062, the hologram device 2064, or the projector 2066.

The interface 2070 may include, for example, a High-Definition Multimedia Interface (HDMI) 2072, a Universal Serial Bus (USB) 2074, an optical interface 2076, or a D-subminiature (D-sub) 2078. The interface 2070 may have the same or similar structure to the input unit 120 of FIG. 1. Additionally or alternatively, the interface 2070 may include, for example, a Mobile High-definition Link (MHL) interface, a Secure Digital (SD) card/Multi-Media Card (MMC) interface, or an Infrared Data Association (IrDA) standard interface.

The audio module 2080 may bilaterally convert, for example, a sound and an electrical signal. The audio module 2080 may process sound information input or output through, for example, a speaker 2082, a receiver 2084, earphones 2086, the microphone 2088, or the like.

The camera module 2091 is, for example, a device which may photograph a still image and a dynamic image. According to an embodiment, the camera module 2091 may include one or more image sensors (for example, a front sensor or a back sensor), a lens, an Image Signal Processor (ISP) or a flash (for example, LED or xenon lamp).

The power management module 2095 may manage, for example, power of the electronic device 2001. According to an embodiment of the present disclosure, the power management module 2095 may include a Power Management Integrated Circuit (PMIC), a charger Integrated Circuit (IC), or a battery or fuel gauge. The PMIC may have a wired and/or wireless charging scheme. Examples of the wireless charging method may include, for example, a magnetic resonance method, a magnetic induction method, an electromagnetic method, and the like. Additional circuits (for example, a coil loop, a resonance circuit, a rectifier, etc.) for wireless charging may be further included. The battery gauge 2096 may measure, for example, the remaining amount of battery, a charging voltage and current, or temperature. The battery 2096 may include, for example, a rechargeable battery and/or a solar battery.

The indicator 2097 may display a particular status of the electronic device 2001 or a part thereof (for example, the AP 2010), for example, a booting status, a message status, a charging status, or the like. The motor 2098 may convert an electrical signal into mechanical vibrations, and may generate a vibration or haptic effect. Although not illustrated, the electronic device 2001 may include a processing unit (for example, GPU) for mobile TV support. The processing device for supporting mobile TV may process media data according to a standard of Digital Multimedia Broadcasting (DMB), Digital Video Broadcasting (DVB), media flow or the like.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination. For example, the electronic device of FIG. 1 may include at least one of the elements of the electronic device as described above.

Figure 21:
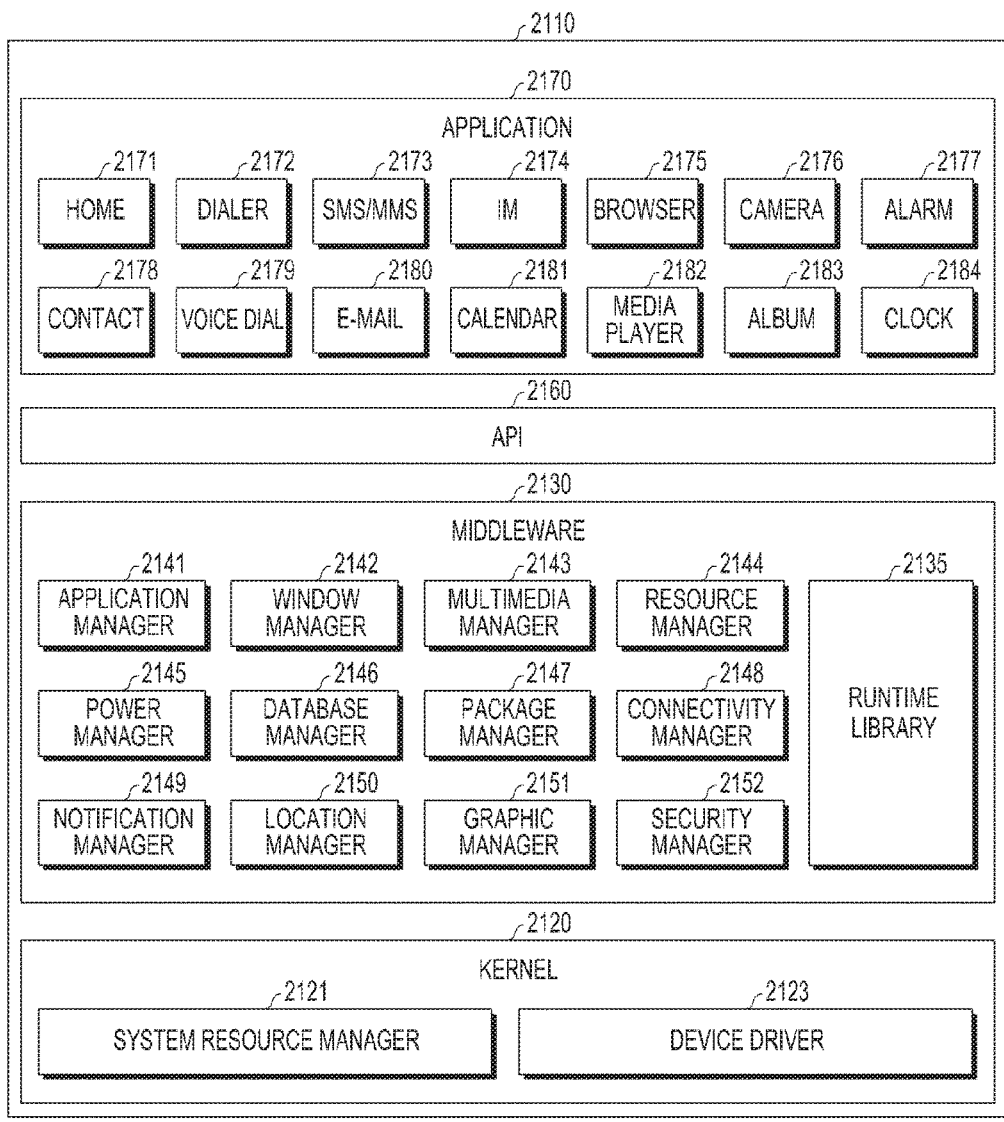
FIG. 21 illustrates a detailed structure of an electronic device according to an embodiment of the present disclosure.

FIG. 21 is a block diagram of a program module according to various embodiments of the present disclosure. According to various embodiments of the present disclosure, the program module 2110 (for example, a program) may include an operating system (OS) that controls resources related to the electronic device (for example, the electronic device 101 of FIG. 1) and/or various applications driven on the operating system. The operating system may be, for example, Android, iOS, Windows, Symbian, Tizen, Bada, or the like.

The program module 2110 may include a kernel 2120, a middleware 2130, an Application Programming Interface (API) 2160, or applications 2170. At least a part of the program module 2110 may be preloaded on the electronic device, or downloaded from a server.

The kernel 2120 may include, for example, a system resource manager 2121 or a device driver 2110. The system resource manager 2121 may control, allocate, or retrieve the system resources. According to one embodiment of the present disclosure, the system resource manager 2121 may include a process management unit, a memory management unit, or a file system management unit. The device driver 2123 may include, for example, a display driver, a camera driver, a Bluetooth driver, a shared-memory driver, a USB driver, a keypad driver, a Wi-Fi driver, an audio driver, or an Inter-Process Communication (IPC) driver.

The middleware 2130 may provide a function required by the applications 1670 in common or provide various functions to the applications 2170 through the API 2170 so that the applications 2160 can efficiently use limited system resources of the electronic device. According to an exemplary embodiment, the middleware 2130 may include, for example, at least one of a runtime library 2135, an application manager 2141, a window manager 2142, a multimedia manager 2143, a resource manager 2144, a power manager 2145, a database manager 2146, a package manager 2147, a connectivity manager 2148, a notification manager 2149, a location manager 2150, a graphic manager 2151, and a security manager 2152.

The runtime library 2135 may include, for example, a library module that a compiler uses in order to add new functions through a programming language while the applications 2170 are executed. The runtime library 2135 may perform input/output management, memory management, or a function for an arithmetic function.

For example, the application manager 2141 may manage a life cycle of at least one of the applications 2170. The window manager 2142 may manage a GUI resource used in a screen. The multimedia manager 2143 may detect a format required for reproducing various media files and encode or decode a media file using a codec appropriate for the corresponding format. The resource manager 2144 may manage resources, such as a source code, a memory, or a storage space, of at least one of the applications 2170.

The power manager 2145 may operate together with, for example, a Basic Input/Output System (BIOS), so as to manage a battery or power and may provide power information required for the operation of the electronic device. The database manager 2146 may generate, search for, or change a database to be used by at least one of the applications 2170. The package manager 2147 may manage the installation or the updating of applications distributed in a package file form.

For example, the connectivity manager 2148 may manage wireless connections, such as Wi-i or Bluetooth. The notification manager 2149 may display or notify of an event such as a received message, an appointment, a proximity notification, and the like to a user without disturbance. The location manager 2150 may manage location information of the electronic device. The graphic manager 2151 may manage graphic effects to be provided to a user and user interfaces related to the graphic effects. The security manager 2152 may provide various security functions required for system security or user authentication. According to an embodiment of the present disclosure, when the electronic device (for example, the electronic device 101 of FIG. 1) has a phone function, the middleware 2130 may further include a telephony manager for managing a voice or video communication function of the electronic device.

The middleware 2130 may include a middleware module for forming a combination of various functions of the aforementioned components. The middleware 2130 may provide modules specialized according to the type of OS in order to provide differentiated functions. In addition, some existing components may be dynamically removed from the middleware 2130, or new components may be added to the middleware 2130.

The API 2160 is, for example, a set of API programming functions, and may be provided in another configuration according to an operating system. For example, for each platform, one API set may be provided in a case of Android or iOS, and two or more API sets may be provided in a case of Tizen.

The application 2170 may include, for example, a home 2171, a dialer 2172, an SMS/MMS 2173, an instant message (IM) 2174, a browser 2175, a camera 2176, an alarm 2177, a contact 2178, a sound dial 2179, an e-mail 2180, a calendar 2181, a media player 2182, an album 2183, a clock 2184, or at least one application that may provide health care (for example, measuring an exercise degree or blood glycose) or environmental information.

According to various embodiments of the present disclosure, the application 2170 may include an application (hereinafter, 'an information exchange application for convenience of description) that supports information exchange between the electronic device (for example, the electronic device 101 of FIG. 1) and an external device. The information exchange application may include, for example, a notification relay application for transmitting predetermined information to the external electronic device, or a device management application for managing the external electronic device.

For example, the notification relay application may include a function of delivering notification information generated in another application (for example, an SMS/MMS application, an e-mail application, a health care application, or an environmental information application) of the electronic device to an external device. The notification relay application may receive notification information from, for example, an external electronic device and provide the received notification information to a user. For example, the device management application may manage (for example, install, delete, or update) at least one function of the external electronic device (for example, the electronic device 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment of the present disclosure, the application 2170 may include an application (for example, a health care application) designated according to an attribute of the external electronic device (for example, as an attribute of the electronic device, and the type of the electronic device is a mobile medical device). According to an embodiment of the present disclosure, the application 2170 may include an application received from an external electronic device. According to an embodiment of the present disclosure, the applications 2170 may include a preloaded application or a third party application that can be downloaded from a server. The names of the components of the program module 2110 of the illustrated embodiment of the present disclosure may be changed according to the type of operating system.

According to various embodiments, at least a part of the programming module 2110 may be implemented in software, firmware, hardware, or a combination of two or more thereof. At least some of the programming module 2110 may be implemented (for example, executed) by, for example, the processor (for example, the AP 2110). At least some of the programming module 2110 may include, for example, a module, program, routine, sets of instructions, process, or the like for performing one or more functions.

The term "module" or "functional unit" used herein may, for example, mean a unit including one of hardware, software, and firmware or a combination of two or more of them. The "module" may be interchangeably used with, for example, the term "unit", "logic", "logical block", "component", or "circuit". The "module" or "function unit" may be a minimum unit of an integrated component element or a part thereof. The "module" may be a minimum unit for performing one or more functions or a part thereof. The "module" or "function unit" may be mechanically or electronically implemented. For example, the "module" or "function unit" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the controller 110 of FIG. 1 or the application processor 2010 of FIG. 20), may cause the one or more processors to execute the function corresponding to the instruction. The computer-readable storage medium may be, for example, the memory.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Various embodiments of the present disclosure provide a computer readable recording medium in which a program performed on a computer is recorded, wherein the program includes executable commands that, when a processor is executed, allows the processor to perform: an operation of sequentially receiving fingerprints of a user; an operation of displaying information on a fingerprint registration progress situation in correspondence to the plurality of sequentially input fingerprints; an operation of determining whether a fingerprint of the user is to be registered according to the fingerprint registration progress situation information; and an operation of registering a fingerprint of the user by using at least some of the plurality of fingerprints.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a fingerprint input unit that sequentially receives at least one fingerprint of a user sensed by at least one sensor;
   a display unit; and
   a controller configured to:

control the display unit to display information of an initially received fingerprint among the at least one fingerprint, change a display attribute gradually of the at least one fingerprint of the user based on an overlapping degree of the at least one fingerprint that is sequentially received, control the display unit to display information, sequentially, of the at least one fingerprint of the user according to the changed display attribute, and register a final fingerprint generated using at least one of a plurality of sequentially received fingerprints.

2. The electronic device of claim 1, wherein the controller is configured to change the display attribute to display a fingerprint shape of a currently received fingerprint of the user more densely than a fingerprint shape of a previously received fingerprint of the user.

3. The electronic device of claim 1, wherein the controller is configured to change the display attribute to display a fingerprint shape of a currently received fingerprint of the user more brightly or clearly than a fingerprint shape of a previously received fingerprint of the user.

4. The electronic device of claim 1, wherein the controller is further configured to control the display unit, whenever the at least one fingerprint of the user is received, to display fingerprint registration progress rates based on information relating to a fingerprint registration progress situation corresponding to the received at least one fingerprint of the user.

5. The electronic device of claim 1, wherein the controller is further configured to compare the plurality of sequentially received fingerprints to identify an overlapping fingerprint area and a non-overlapping fingerprint area of a currently received fingerprint, to differently set display attributes of the overlapping fingerprint area and the non-overlapping fingerprint area, and to display the currently received fingerprint according to the set display attributes.

6. The electronic device of claim 1, wherein the controller is further configured to synthesize fingerprint images generated in correspondence to the plurality of sequentially received fingerprints, and registers the final fingerprint based on a fingerprint image within a predetermined radius from a most overlapping fingerprint area on the synthesized fingerprint images.

7. The electronic device of claim 1, wherein the controller is further configured to identify a location of a reference feature point detected from a currently received fingerprint of the user and to guide a fingerprint input direction for a next fingerprint input according to the identified location.

8. The electronic device of claim 1, wherein the controller is further configured to set a central area of a current received fingerprint of the user as a reference area and to guide a fingerprint input direction for a next fingerprint input based on the reference area.

9. The electronic device of claim 1, wherein the controller is further configured to set a fingerprint area based on a distribution of a plurality of feature points detected from the plurality of sequentially received fingerprints, and register the final fingerprint containing the set fingerprint area.

10. A method of registering a fingerprint in an electronic device, the method comprising:

sensing, sequentially, at least one fingerprint of a user by at least one sensor;

displaying information of an initially received fingerprint among the at least one fingerprint;

changing a display attribute gradually of the at least one fingerprint of the user based on an overlapping degree of the at least one fingerprint that is sequentially received;

displaying, sequentially, the at least one fingerprint of the user according to the changed display attribute; and registering a final fingerprint generated using at least one of a plurality of sequentially received fingerprints.

11. The method of claim 10, wherein the display attribute of the at least one fingerprint of the user is changed to display a fingerprint shape of a currently received fingerprint of the user more densely than a fingerprint shape of a previously received fingerprint of the user.

12. The method of claim 10, wherein the display attribute of the at least one fingerprint of the user is changed to display a fingerprint shape of a currently received fingerprint of the user more brightly or clearly than a fingerprint shape of a previously received fingerprint of the user.

13. The method of claim 10, the method further comprising:

identifying fingerprint registration progress rates based on information relating to a fingerprint registration progress situation whenever fingerprints of the user are received; and displaying the identified fingerprint registration progress rates.

14. The method of claim 10, wherein changing the display attribute of the at least one fingerprint of the user comprises:

comparing the plurality of sequentially received fingerprints;

identifying an overlapping fingerprint area and a non-overlapping fingerprint area of a current received fingerprint according a result of the comparison; and differently setting display attributes of the overlapping fingerprint area and the non-overlapping fingerprint area.

15. The method of claim 10, wherein registering the final fingerprint generated using the at least one of the plurality of sequentially received fingerprints comprises:

synthesizing generated fingerprint images in correspondence to the plurality of sequentially received fingerprints; and registering the final fingerprint based on a fingerprint image within a predetermined radius from a most overlapping fingerprint area on the synthesized fingerprint images.

16. The method of claim 10, wherein registering the final fingerprint generated using the at least one of the plurality of sequentially received fingerprints comprises:

setting a fingerprint area, which is to be registered, based on a distribution of a plurality of feature points detected from the plurality of sequentially received fingerprints; and registering the final fingerprint containing the set fingerprint area.

17. The method of claim 10, further comprising:

guiding a fingerprint input direction for the a next fingerprint input based on a location of a reference feature point or a reference area.

18. A non-transitory computer readable recording medium in which a program performed on a computer is recorded, wherein the program comprises executable commands that, when a processor is executed, cause the processor to:

an operation of sensing, sequentially, at least one fingerprint of a user by at least one sensor;

an operation of displaying information of an initially received fingerprint among the at least one fingerprint;

an operation of changing a display attribute gradually of the at least one fingerprint of the user based on an overlapping degree of the at least one fingerprint that is sequentially received;
an operation of displaying, sequentially, the at least one fingerprint of the user according to the changed display attribute; and
an operation of register a final fingerprint generated using at least one of a plurality of sequentially received fingerprints.

* * * * *